Patented Apr. 30, 1946

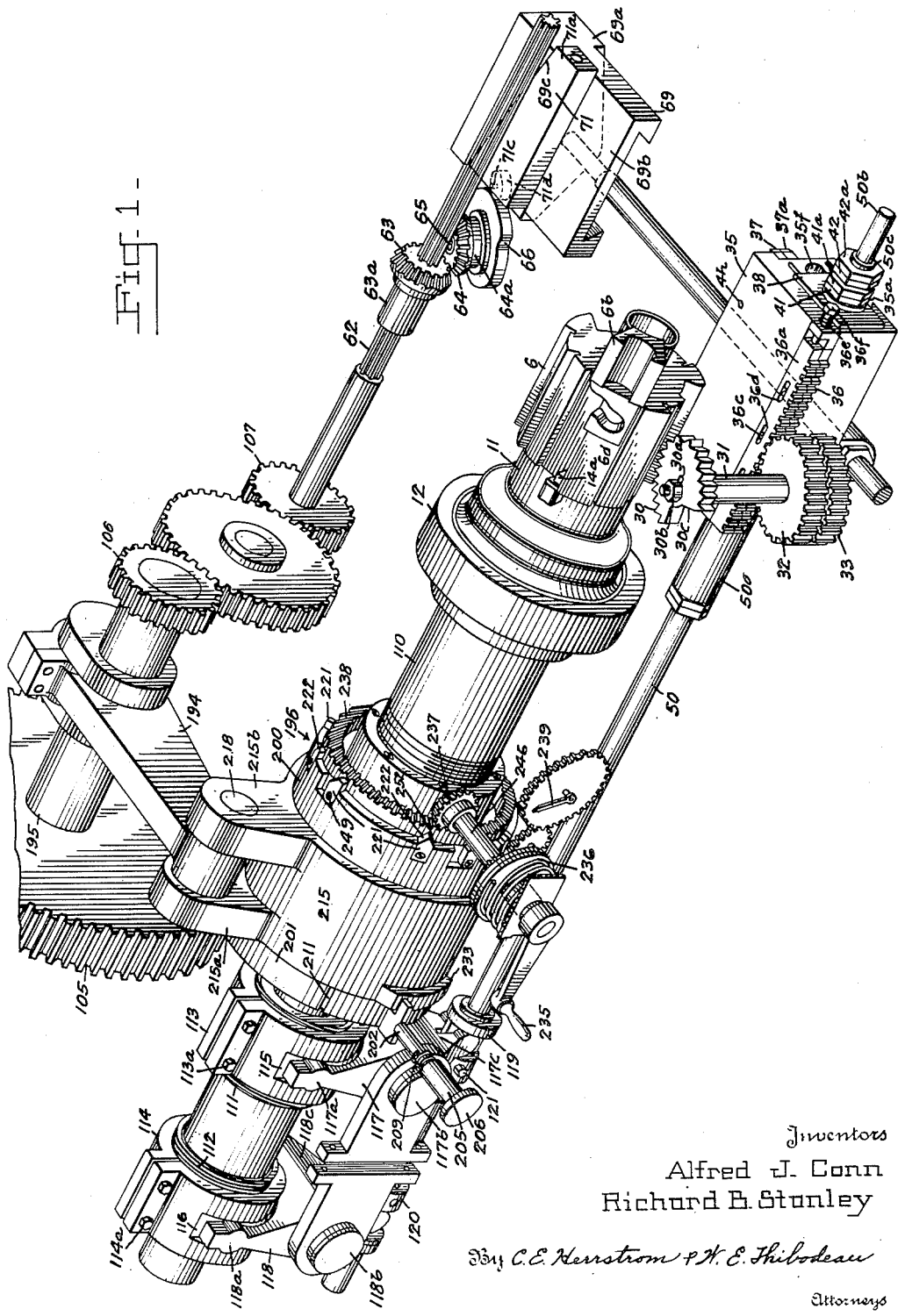

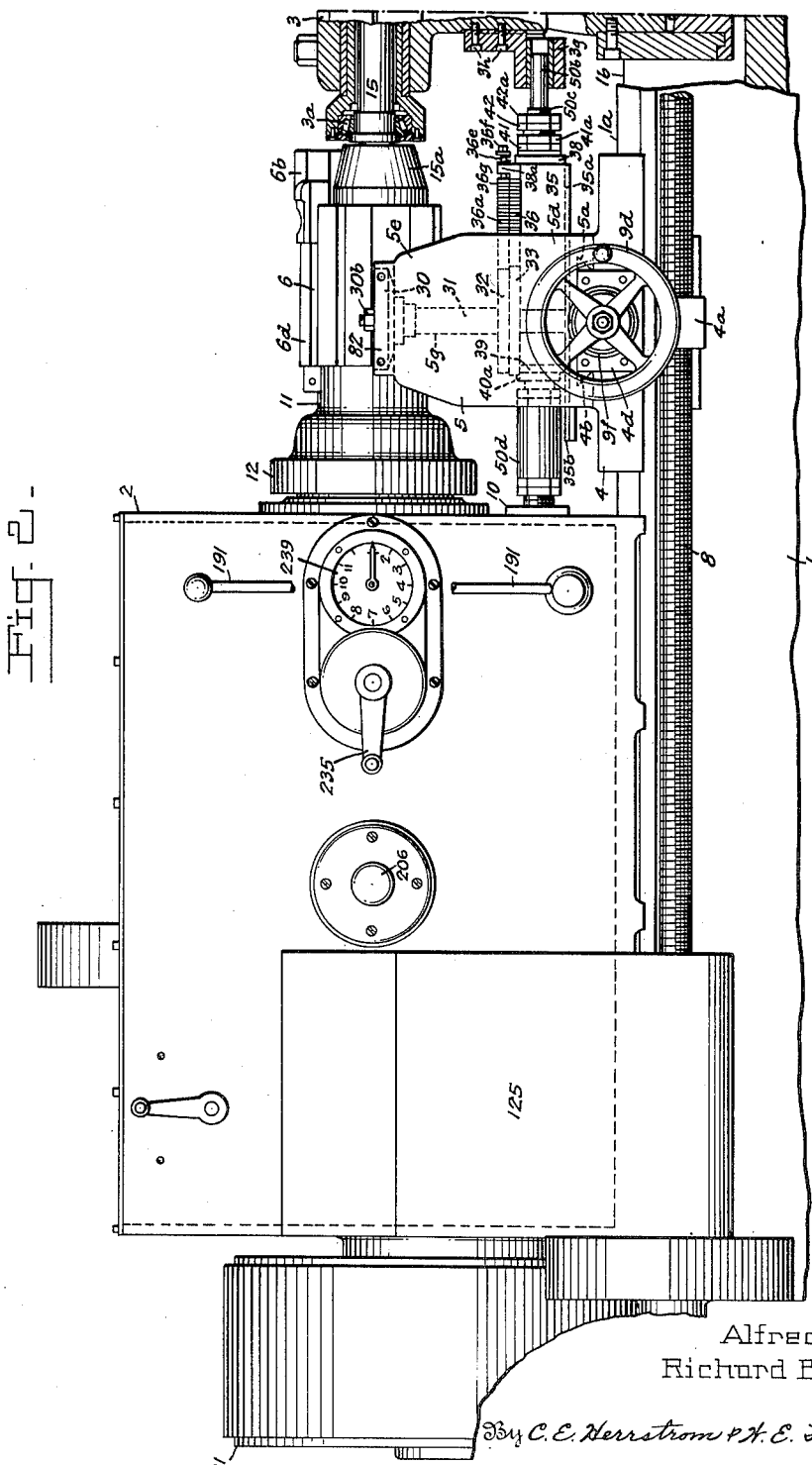

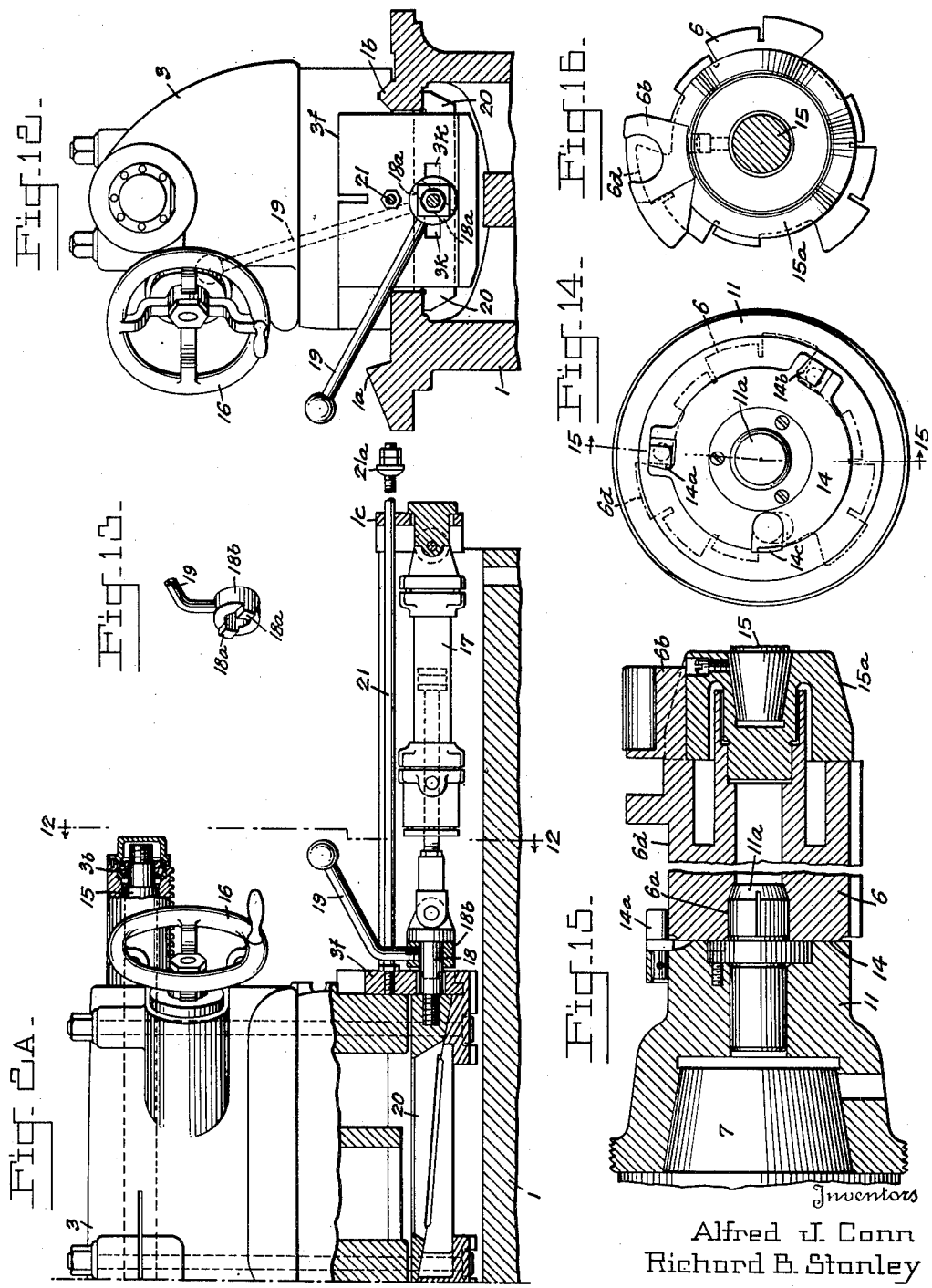

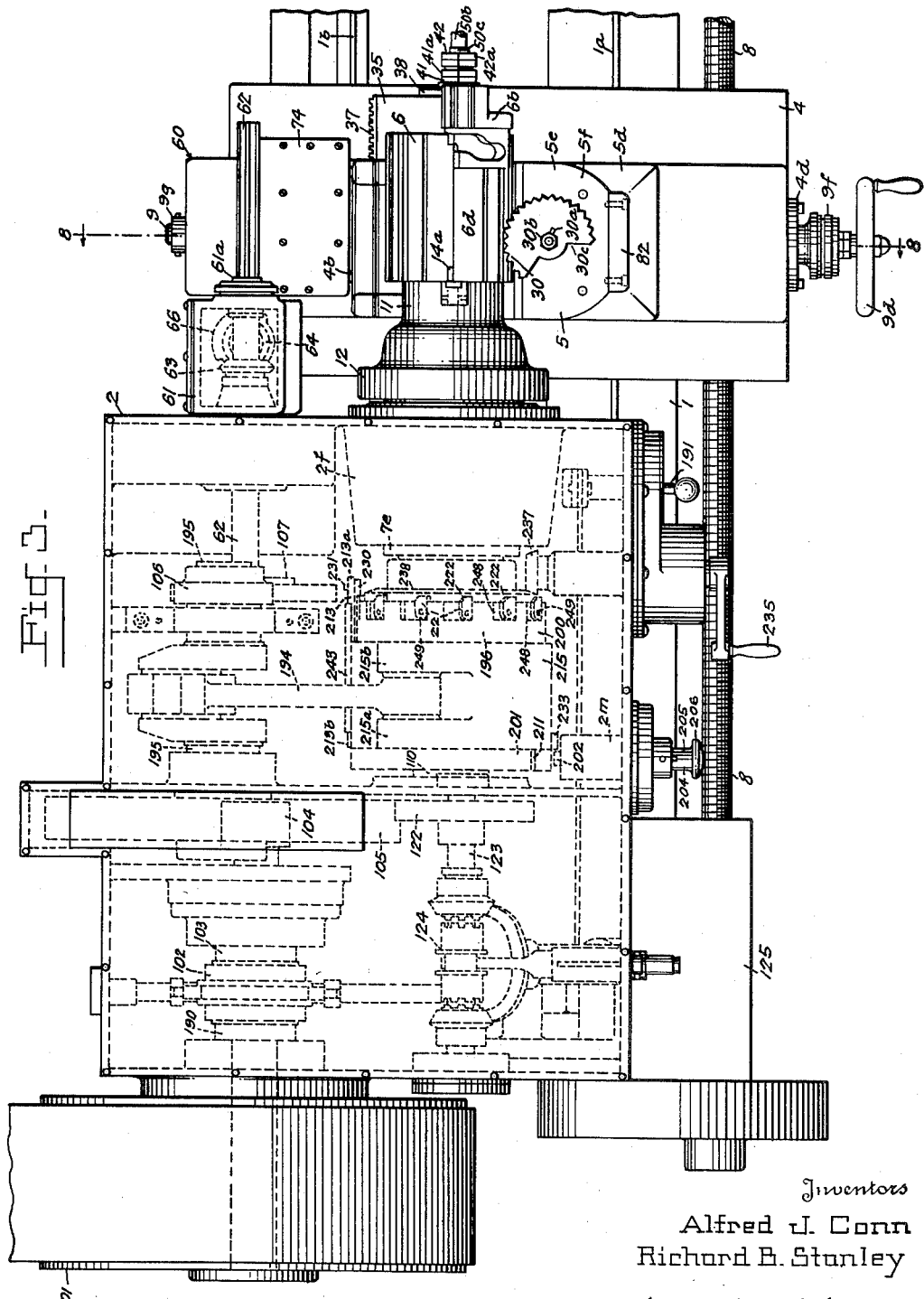

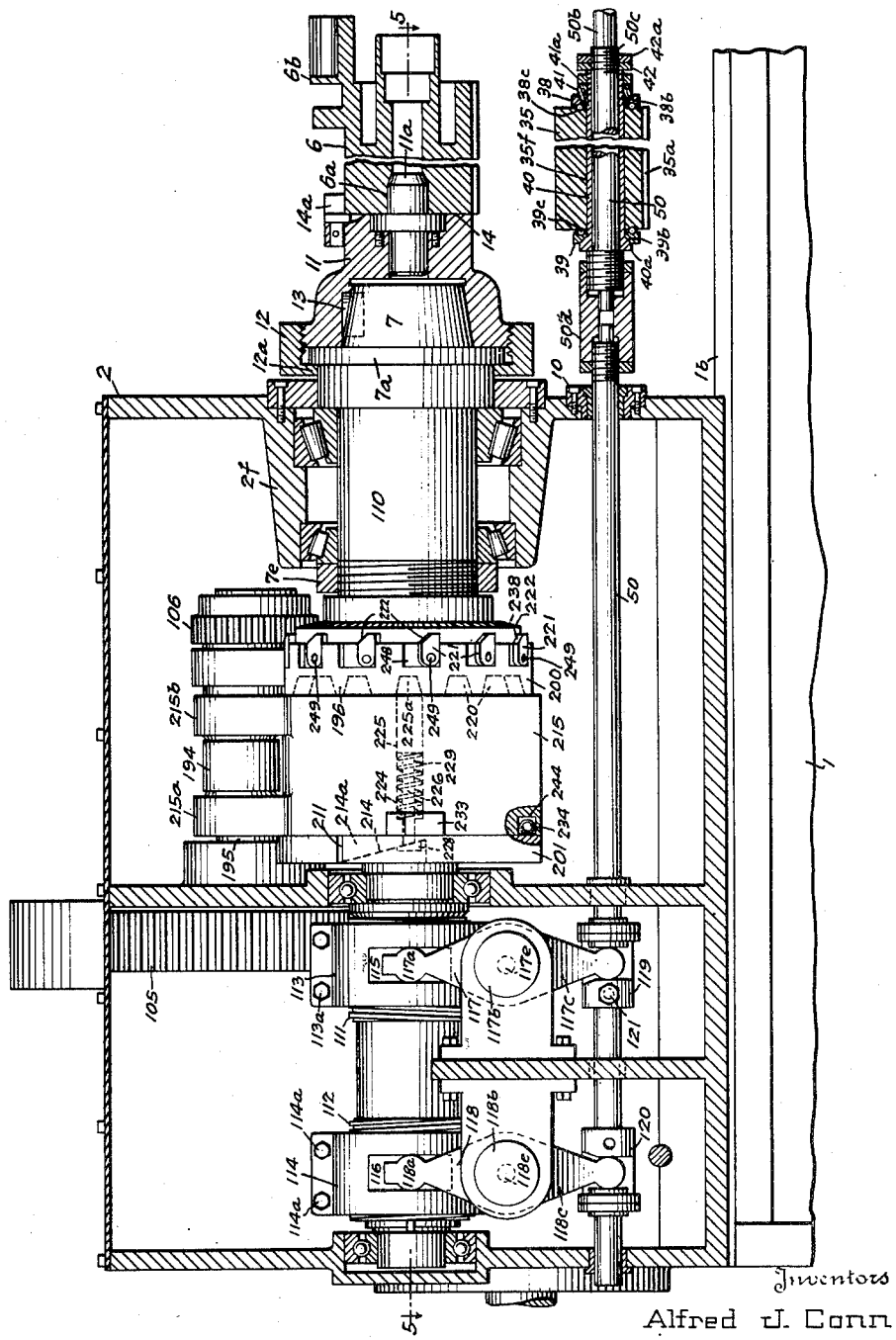

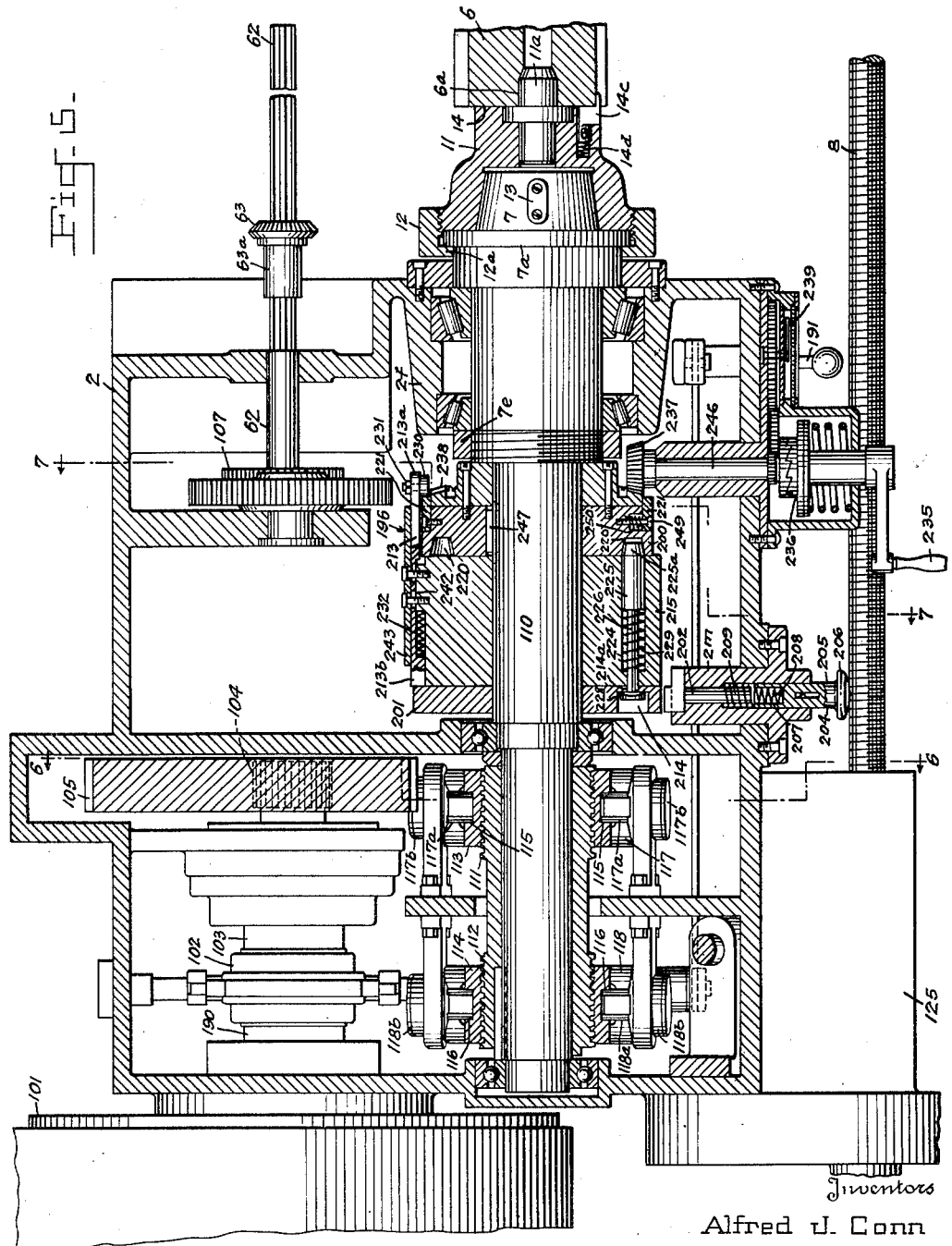

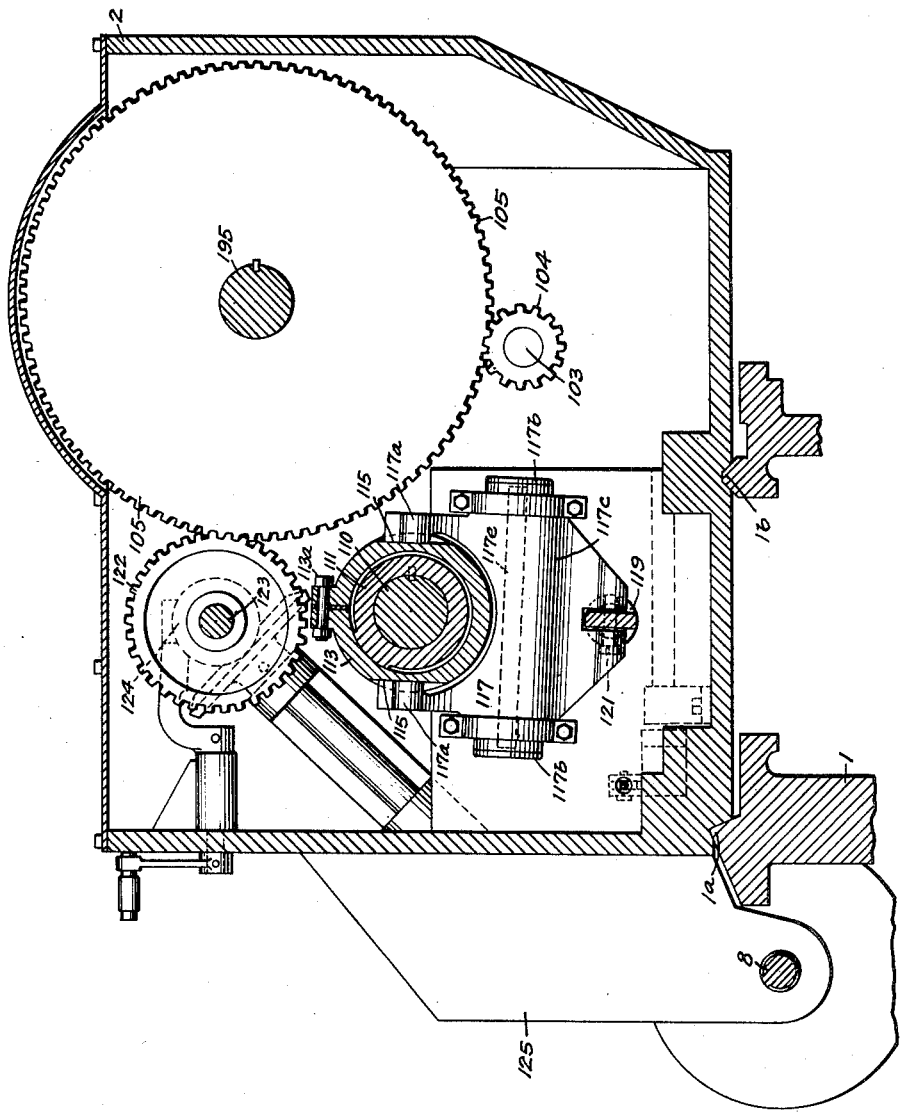

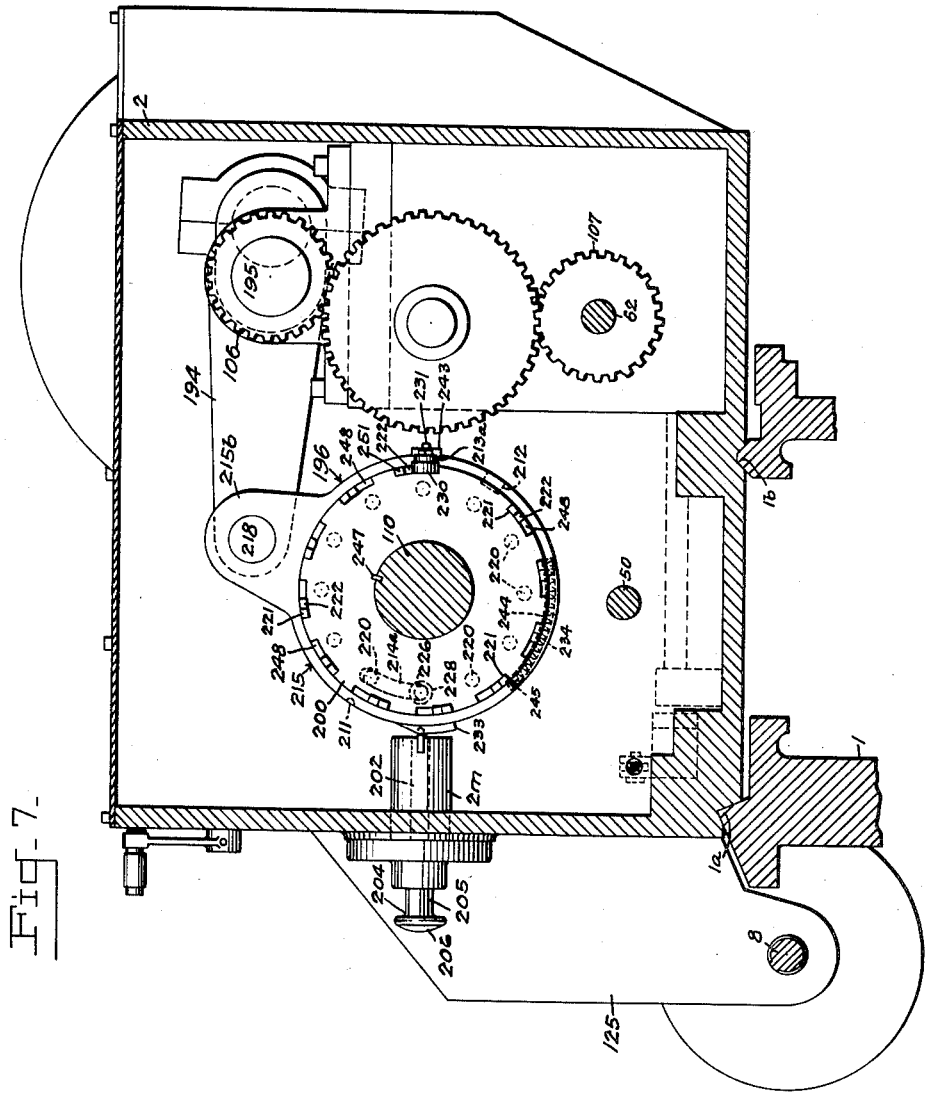

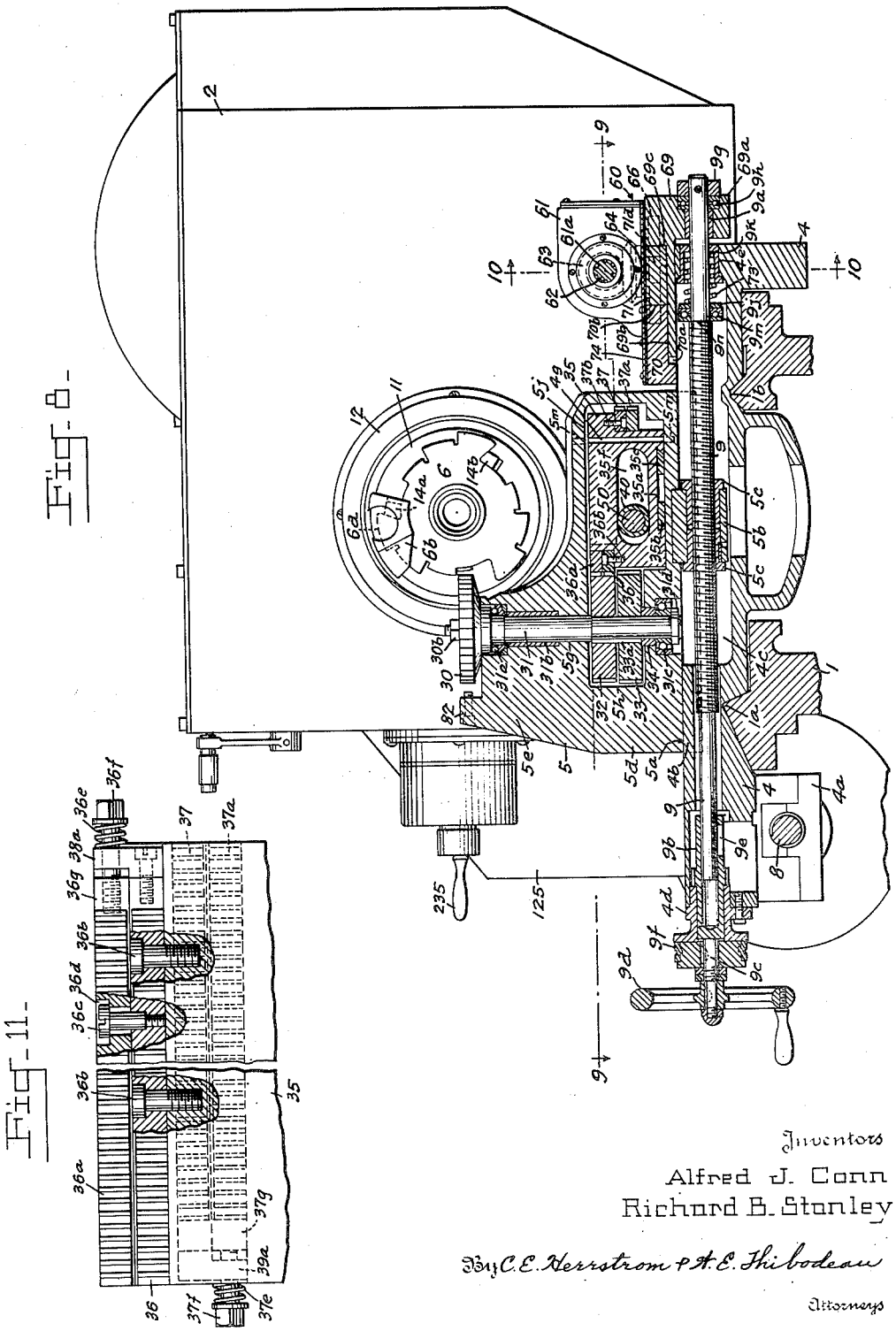

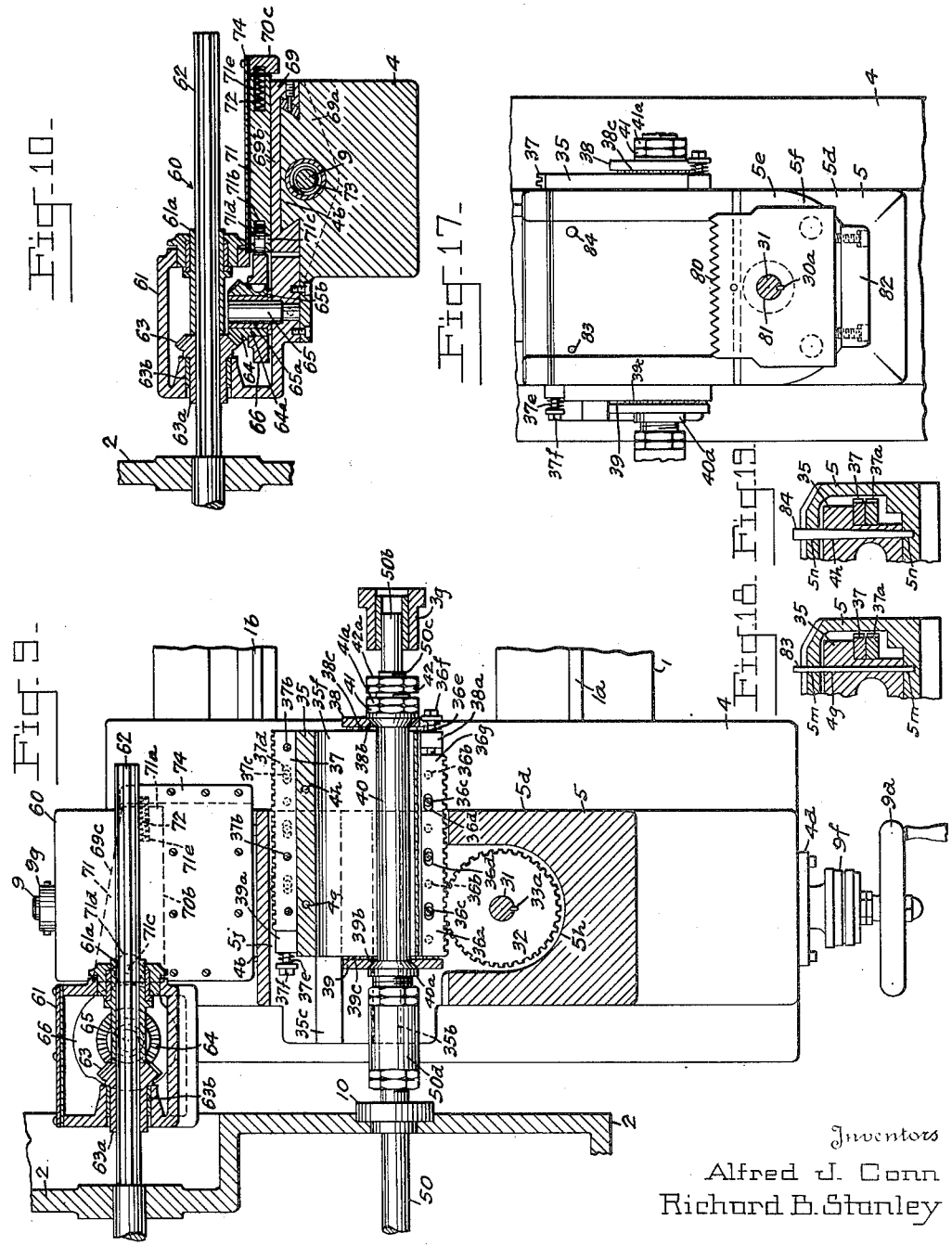

2,399,594

UNITED STATES PATENT OFFICE 2,399,594

MACHINE TOOL

Alfred J. Conn and Richard B. Stanley, Chicago, Ill., assignors to La Salle Designing Company, Chicago, Ill., a partnership composed of Alfred J. Conn, Albert S. Ginsburg, and Abraham Snide Application November 22, 1943, Serial No. 511,298

50 Claims. (Cl. 10—101)

This invention relates to a thread-cutting method and to a machine tool incorporating such method.

The thread-cutting method and machine embodying the invention are particularly adapted to the cutting of threads on stepped cylindrical surfaces, such as are found, for example, on the exterior surface of the breech block of large caliber guns. Such breech blocks comprise a cylindrical member having a reoccurring series of stepped surfaces around its periphery. All such surfaces are threaded except for the minimum radii surfaces. Thus if each surface has an arcuate extent of 30°, then when the step threaded breech block is inserted in a correspondingly shaped breech all threads of the breech block may be engaged in the breech by a rotation of only 30°. The speed of locking and unlocking of the breech thereby obtained is obvious.

It is necessary that the threads cut on such stepped breech block be highly accurate. Furthermore it is desirable that the thread cut on each stepped segment be so aligned with the threads of the other segments that the analogy of a continuous thread is produced around the periphery of the stepped breech block. The cutting of such threads is further complicated by the fact that on at least one of the stepped surfaces the thread does not extend completely across the length of the surface but is stopped shorter than the thread on the other surfaces by a projecting lug which contains a rotating cam.

Obviously the application of conventional thread-cutting methods and machines to such a complicated shape has resulted in an exceedingly lengthy cutting process which did not produce a satisfactory thread cut and required considerable hand working in addition.

Accordingly it is an object of this invention to provide an improved thread-cutting machine.

A further object of this invention is to provide an improved machine for quickly and accurately cutting a continuous thread on stepped cylindrical surfaces.

A further object of this invention is to provide an improved thread-cutting method wherein the pitch of the threads cut is independent of the rate at which the cutter is moved along the work piece by the feeding mechanism.

The specific nature of the invention as well as other objects thereof will clearly appear from a description of a preferred embodiment as shown in the accompanying drawings in which:

Fig. 1 is a perspective view of the more important elements of the invention.

Fig. 2 is a partial side elevational view, partly in longitudinal section, of the threading machine with a breech block mounted thereon and in position for threading.

Fig. 2A is a similar view showing the parts omitted in Fig. 1.

Fig. 3 is a top plan view of the tool post and carriage in operative relation to the headstock.

Fig. 4 is a vertical longitudinal sectional view of the headstock showing the indexing and tool oscillating mechanisms in side elevation.

Fig. 5 is a horizontal longitudinal section taken on the line 5—5 of Fig. 4.

Fig. 6 is a vertical cross sectional view of the headstock taken on the line 6—6 of Fig. 5.

Fig. 7 is a similar view taken on the line 7—7 of Fig. 5.

Fig. 8 is a vertical cross sectional view of the machine taken on the line 8—8 of Fig. 3 and showing the tool post and carriage in longitudinal section.

Fig. 9 is a horizontal sectional view taken on the line 9—9 of Fig. 8.

Fig. 10 is a vertical section taken on the line 10—10 of Fig. 8, showing the cam operated relief wedge and the manner of mounting the relief mechanism.

Fig. 11 is a fragmentary elevation of the rack support with parts broken away to show the slidable action of the racks.

Fig. 12 is a vertical cross sectional view of the hydraulic actuated tailstock taken on the line 12—12 of Fig. 2A.

Fig. 13 is a detail view of the means for locking the tailstock wedge in one of its positions.

Fig. 14 is a face view of the chuck showing the fixed and adjustable jaws for engagement with their respective shoulders on the breech block blank to drive the blank in clockwise and counter-clockwise movement; the blank being shown in broken lines.

Fig. 15 is a longitudinal sectional view on the line 15—15 of Fig. 14.

Fig. 16 is an end elevation of the breech block blank and pilot as seen from the right hand end of Fig. 15, showing the inter-fitting engagement of the rotating cam lug on the blank and the recess in the pilot of the tailstock center.

Fig. 17 is a top plan of the tool post showing the scraper or finishing blade in position.

Fig. 18 is a detail sectional view showing the locating pin in position when rack support is to be secured during use of the finishing blade.

Fig. 19 is a similar view of the taper pin used to effect a rigid connection between the rack support and the tool post during use of the finishing blade.

A compound engine lathe of conventional design may be readily modified to produce a thread-cutting machine tool in accordance with this invention. As shown in assembled relation in Figs. 2 and 2A, the complete thread-cutting mechanism embodies a lathe bed 1 upon which is mounted a headstock 2, a tailstock 3 and a compound rest 4. A tool post 5 is supported on the compound rest 4 and a cutter 30 is mounted on the tool post. A work piece 6 which will be described as a step threaded breech block blank is mounted on a spindle 7 which is rotatably supported in a roller bearing mounting within a bushing 2f provided in the wall of the headstock 2 (Fig. 4).

Figs. 2, 3, 8, 9 and 10 show an assembled compound rest modified in accordance with this invention. The compound rest assembly 4 is conventionally mounted for longitudinal movement on the ways 1a and 1b of the lathe bed 1. Movement of the compound rest along the ways 1a and 1b is accomplished by a conventional feed screw 8 which threadably engages a depending portion 4a of the compound rest 4 (Fig. 8). A conventional half nut disconnecting mechanism (not shown) is provided to disengage the compound rest from the feed screw 8.

The tool post 5 is mounted on the top of the compound rest 4 by engagement of an upstanding integral longitudinal dovetailed projection 4b (Fig. 2) in a correspondingly shaped slot 5a in the base of the tool post 5. The slot 5a is slightly wider than the projection 4b. This mounting method obviously permits transverse movement of the tool post with respect to the lathe bed and in addition, slight transverse movement with respect to the compound rest.

Immediately under the central portion of the tool post 5, a large recess 4c (Fig. 8) is provided in the compound tool rest. A collar 5b is bolted or otherwise suitably secured to the base of the tool post and projects into the recess 4c. A pair of hollow boltlike members 5c are secured in opposite ends of the collar 5b. The interior surface of the boltlike members 5c are threaded to engage a cross feed screw 9. The boltlike members 5c are thereby held tightly in engagement with the collar 5b by tightening them on the threaded cross feed screw 9. A suitable key is provided to lock the boltlike members 5c to the collar 5b.

The cross feed screw 9 extends completely through the compound rest 4 and is supported at its back end by a journal bearing 9a provided in the compound rest 4 (Fig. 8). At its front end the cross feed screw 9 is slidably supported in a hollow journal 9b which is in turn secured to a shaft 9c upon which a hand wheel 9d is mounted. A key 9e is provided to lock feed screw 9 to the hollow journal 9b so far as rotational movement is concerned. The length of the hollow journal 9b is such as to permit appreciable longitudinal movement of the cross feed screw shaft 9 within the journal. The journal 9b is in turn mounted in bearing relation in a bracket 4d which is bolted or otherwise secured to the front end of the compound tool rest 4. A conventional micrometer arrangement 9f is mounted on the shaft 9c between the hand wheel 9d and the journal 9b. It will be apparent that manual operation of the hand wheel 9d will produce a transverse movement of the tool post 5 with respect to the compound rest 4 and the extent of such movement may be measured by the micrometer 9f. Furthermore the tool post 5 may be reciprocated with respect to the compound rest by transverse movement of cross feed screw 9 without interference.

The tool post 5 comprises a rectangular base 5d and a forward integral, upwardly projecting portion 5e which projects somewhat above the base 5d. A flat surface 5f is provided on the top of the projecting portion 5e. The rear portion of the tool post 5 is shaped to provide suitable clearance for the work piece 6 and extends under the work piece 6. Approximately in the center of the flat surface 5f a vertical hole 5g extending down thru tool post 5 is provided to receive a cutter shaft 31. The upper part of the hole 5g is counterbored to receive a thrust bearing 31a. Immediately below the bearing 31a the hole 5g is longitudinally counterbored to receive a bearing 31b. In the center of the base portion 5d of tool post 5 a circular recess 5h is centrally provided about the axis of the shaft 31 to house two gears 32 and 33 which are secured to the shaft 31 by a key 33a. Below the gear 33 the hole 5g is again enlarged to receive a cylindrical spacer 34. The bottom of hole 5g is counterbored to receive a radial ball bearing 31c. The end of cutter shaft 31 is suitably threaded and a nut 31d fastened thereon serves to hold the shaft 31 and the bearing 31c in assembled relation. On the top of the shaft 31 a rotary cutter 30 is secured as by a key 30a (Figs. 1 and 3). The cutter 30 rests upon the ball thrust bearing 31a and is secured to the spindle by a nut 30b screwed onto the top end of the spindle.

A longitudinal rectangular recess 5j is provided in that portion of the base 5d of the tool post 5 underlying the work piece 6 and houses a rack support 35. The rectangular recess 5j adjoins recess 5h within the tool post 5. The rack support 35 is slidably mounted within the recess 5j by the dovetailed slot 35a in its base which engages the dovetailed ribs 35b and 35c on the base of the recess 5j. The dovetailed ribs 35b and 35c are secured to the base of recess 5j by means of bolts and dowel pins.

Approximately in the center of the rack support 35 a longitudinal slot 35f is provided to receive a reciprocating rod 50. A rack 36 is mounted in a suitable recess on the upper forward edge of the rack support 35 and is secured to the rack support 35 by the screws 36b. A rack 36a comprised of the same number and form of teeth as contained on the rack 36 is mounted on top of the rack 36. The rack 36a is slidably secured to the rack 36 by screws 36c which are inserted in suitably slotted holes 36d in the rack 36a (Figs. 9 and 11.) The slotted holes 36d provide for slight longitudinal movement of the rack 36a relative to the rack 36. The racks 36 and 36a simultaneously engage the top gear 32; however the rack 36a is resiliently biased along its longitudinal axis by a spring 36e. A bolt 36f, threadably secured to the end 36g of rack 36a, is provided for mounting the spring 36e. The bolt 36f also passes through a bracket 38a suitably secured to the end of rack 36 and spring 36e is mounted on bolt 36f between the head of the bolt and bracket 38a. This biasing arrangement is provided to eliminate backlash between racks and gear 32 for the one direction of motion of the racks which corresponds with the cutting stroke of the machine. On the opposite side of rack support 35 there is also mounted a pair of superimposed racks 37 and 37a having teeth meshable with lower gear 33. This pair of racks is mounted in a similar manner as racks 36 and 36a and are so arranged that when rack support 35 is removed, turned end for end and remounted in recess 5j of the tool post, with dovetailed slot 35a again engaging the dovetailed ribs 35b and 35c, then racks 37 and 37a will engage lower gear 33. The rack 37 is secured to rack support 35 by screws 37b and rack 37a is then secured to rack 37 by screws 37c (Fig. 9) which pass thru slotted holes 37d in rack 37a. A bolt 37f, threadably secured to the end 37g of rack 37a is provided for mounting the spring 37e. The bolt 37f also passes thru a bracket 39a suitably secured to the end of rack 37 and spring 37e is mounted on bolt 37f between the head of the bolt and bracket 39a.

The bearing plates 38 and 39 are secured against the sides of the rack support 35 by means of a sleeve 40 which is slidably mounted on the reciprocating rod 50 which passes through the longitudinal slot 35f in the rack support 35. Suitable countersunk holes 38b and 39b are provided in the bearing plates to accommodate the sleeve 40. A collar 40a is welded or otherwise securely fastened to the sleeve 40 and snugly engages the countersunk hole 39b. The other end of the sleeve 40 which projects thru the bearing plate 38 is threaded and a nut 41 and a check nut 41a are screwed thereon, the inner face of nut 41 snugly engaging the countersunk portion of hole 38b. Between bearing plate 38 and rack support 35 there are provided two parallel rows of ball bearings 38c. These bearings are so arranged as to permit the rack support 35 to be free to move in a transverse direction with respect to the reciprocating rod 50. A similar arrangement of bearings 39c is provided between the bearing plate 39 and the adjacent side of rack support 35.

The reciprocating rod 50 projects outwardly beyond the end of sleeve 40. The extreme end 50b of the rod 50 is of reduced diameter and is adapted to be engaged in bearing relation by a bearing bracket 3g (Fig. 2) which is suitably secured to the lower portion of the tailstock 3 as by the bolts 3h. The tailstock 3, of course, has to be moved into work engaging position to permit the bearing bracket 3g to support the end 50b of reciprocating rod 50. The portion 50c of rod 50 lying between extreme end portion 50b and the end of sleeve 40 is threaded and nut 42 and check nut 42a are screwed on to this portion of the reciprocating rod 50. It will be apparent that with the construction described the rack support 35 may be removed from the tool post 5 for the purpose of using gear 33 instead of gear 32 merely by unfastening the nut 42 and locking nut 42a. The rack support 35 may then be removed from the tool post, turned end for end and reinserted without the necessity of disturbing the assembled bearing plates 38 and 39.

The rod 50 projects thru the bearing plate 39 back into the headstock 2 thru a suitable bearing 10 provided in the front wall of the headstock. Within the headstock a reciprocating motion is imparted to reciprocating rod 50 in a manner that will be described later. Between the headstock bearing 10 and the collar 40a the reciprocating rod 50 is severed and a conventional threaded coupling apparatus 50d is utilized to connect the two portions of the reciprocating rod 50 together. Such coupling 50d should preferably permit limited micromatic longitudinal adjustment of the forward portion of the rod 50 with respect to the rear portion.

The compound rest 4 also carries a relieving mechanism 60 (Figs. 1, 9 and 10) which is mounted on the end of the compound rest farthest from the operator. The relieving mechanism comprises a bearing housing 61 suitably secured to the top surface of the compound rest 4 which supports a shaft bearing 61a. A splined shaft 62 extending out of a suitable bearing in headstock 2 is supported by bearing 61a. Immediately adjacent the splined shaft bearing 61a a beveled gear 63 is mounted on splined shaft 62 to be rotated by shaft 62 but yet free to move along shaft 62 with movement of the compound rest 4. The beveled gear 63 has a long hub portion 63a which is engaged in bearing relation by a suitable bushing 63b in bearing housing 61. A beveled gear 64 cooperating with beveled gear 63 is mounted on a vertical shaft 65. The shaft 65 comprises a stud shaft having its bottom end fixedly mounted in the base of the housing 61. A sleeve bushing 65a is mounted between vertical stud shaft 65 and an interior bearing surface of beveled gear 64. Beveled gear 64 is provided with a relatively long hub 64a and a cam 66 is mounted on such hub portion and keyed thereto. The bushing 65a is provided with a shoulder 65b (Fig. 10) at its base which engages the adjacent face of the cam 66 in bearing relation and serves to support the weight of the cam 66 and beveled gear 64.

On the extreme rear end of cross feed screw 9 a collar 9g is rigidly secured. Relieving motion is imparted to the cross feed screw 9 by an inverted U-shaped wedge block member 69. A depending end portion of wedge block member 69 comprises a bearing bracket 69a which surrounds cross feed screw 9 adjacent to the collar 9g. A ball bearing 9h may be conveniently placed between bearing bracket 69a and collar 9g to permit axial forces to be exerted on cross feed screw 9 without interfering with the rotary motion thereof. The arms of this inverted U-shaped block 69 slidably support block 69 on the ways 4b of compound rest 4 (Fig. 10). The base portion 69b of member 69 overlies a smooth surface on the top of compound rest 4. A rectangular block guide member 70 (Fig. 8) is suitably secured to the top of the compound rest 4 and is provided with a recess 70a which accommodates the end of the base portion 69b. Movement in a direction along the axis of cross feed screw 9 is imparted to the wedge block member 69 for relieving purposes by a wedge 71 (Figs. 1 and 9). The wedge is slidably mounted on top of the base portion 69b and operates between a vertical surface 70b of the guide member 70 and a vertical surface 69c of the wedge block member 69. The narrow portion 71a of the wedge is on the right hand side of the compound rest 4 as viewed in Fig. 9. The wide portion of the wedge is provided with a recess 71b. A vertical pin 71c traverses this recess 71b and on this pin a roller 71d is mounted within the recess. The roller 71d is engageable by the cam 66. The face of the cam 66 is such that during one-half of a revolution the wedge 71 is driven into engagement between wedge block member 69 and the guide member 70. Hence the cross feed screw 9 is moved transversely a slight amount in a work engaging direction. In the other half revolution of the cam 66 the wedge is permitted to retract under the bias of a wedge spring 72 and hence permits the cross feed screw 9 to be moved a slight distance away from the work under the bias of relieving spring 73. Wedge spring 72 operates between a projection 70c on the side of the guide member 70 and a recess 71e in the wedge. The relieving spring 73 is mounted around the cross feed screw 9 and operates between a collar 9j and the base of spring seat 9k (Fig. 8). The collar 9j abuts a ball thrust bearing 9m which in turn abuts against a shoulder 9n provided at the beginning of the threads on the cross feed screw 9. The spring seat 9k comprises a cup-shaped member which is inserted in a suitable horizontal cylindrical recess 4e in the compound rest 4. The lip of the spring seat 9k engages the edge of the recess 4e. A suitable cover 74 may be provided over the top of guide member 70, wedge 71 and U-shaped member 69 to prevent accumulation of dirt and cutting coolant in the wedging surfaces.

The breech block blank 6 is mounted on a specially designed chuck 11 which is in turn secured to spindle 7 (Fig. 4). A coupling 12 is provided having an inwardly projecting shoulder 12a which fits snugly around the periphery of spindle 7 behind a shoulder 7a. The forward portion of coupling 12 is threadably engaged by the rear end of chuck 11. A key 13 bolted to spindle 7 engages a suitable slot in chuck 11.

A pilot 11a bolted to face of chuck 11 is suitably shaped to snugly engage in the recess 6a of breech block blank 6 when the breech block blank is mounted on the spindle. The rotating cam lug 6b on the breech block blank thus is not adjacent the chuck 11. The end of breech block blank 6 abuts against the end surface 14 of the chuck 11.

Projecting forwardly from the periphery of end surface 14 are two fixed jaws 14a and 14b and an adjustable jaw 14c (Fig. 14). The fixed jaws 14a and 14b are so spaced as to respectively engage clockwisely behind shoulders formed on the breech block blank 6 by the stepped surfaces provided therein; thus driving power is transmitted to the breech block blank 6 for its counterclockwise cutting stroke. The adjustable jaw 14c is resiliently biased by a spring 14d mounted behind it within chuck 11 into wedging engagement clockwisely in front of another shoulder of the breech block blank 6 to provide positive drive on the clockwise relieving stroke of the blank. The angle of engagement between jaw 14c and breech block blank 6 is less than the critical friction angle and hence a wedging action results; the breech block blank 6 is gripped tightly between the three jaws as it is pushed onto the chuck 11. The three jaws are of course placed to hold the blank 6 in proper angular relation to the cutter 30.

The other end of breech block blank 6 is supported by a revolving center 15 which is rotatably mounted in the tailstock 3 (Figs. 2 and 2A). This occurs of course when tailstock 3 is moved into its working position. A pilot 15a mounted on revolving center 15 abuts against the end of the breech block blank 6. The revolving center 15 extends through tailstock 3 and is well supported by bearings 3a and 3b. Adjustment of revolving center 15 in a direction along its axis is accomplished by a hand wheel 16 which drives suitable gearing (not shown) connecting with revolving center 15.

The tailstock 3 is mounted on the ways 1a and 1b on lathe bed 1. The tailstock 3 is moved along the lathe bed 1 by a double acting hydraulic motor 17 suitably mounted to lathe bed 1 which is properly supplied with hydraulic fluid for desired direction of operation through a suitable foot operated valve (not shown). A wedge-shaped recess is provided in the base of tailstock 3 and permits a wedge 20 to be forced between the tailstock base and the lathe bed 1, thus locking the tailstock rigidly to the lathe bed. The operating piston of hydraulic motor 17 is connected to the rear of tailstock 3 thru a shaft-like member 18 threadably mounted in the rear end of wedge 20. An integral rectangular projection 18a is provided on a collar 18b surrounding shaft 18. A plate 3f is secured to the rear of tailstock 3 and has a rectangular hole 3k thru which shaft member 18 passes. Collar member 18b is rotatable by handle 19 between two positions which are angularly displaced by a substantial angle. In one position the rectangular projection 18a on collar 18b is misaligned with respect to holes 3k and hence the force of hydraulic motor is applied to move tailstock 3 along the lathe bed to its work engaging position. Upon reaching such position the handle 19 is rotated to its other position where projection 18a is in alignment with hole 3k. Then upon applying the hydraulic force of motor 17 the force will be transmitted to wedge 20, forcing it between tailstock 3 and the lathe bed and hence rigidly securing the tailstock to the bed. Thus all vibration of the tailstock is substantially eliminated.

To retract the tailstock the foot valve (not shown) reverses the fluid applied to motor 17. The shaft 18 being threaded into wedge 20 retracts the wedge and then the end of wedge 20 engages the inner surface of plate 3f and thus the entire tailstock is retracted.

If desired, a stop rod 21 may be provided. Such rod has one end secured to tailstock 3 and the other end passes thru a bushing 1c secured to lathe bed 1. A stop 21a is adjustably secured to the extreme end of rod 21. Thus the movement of tailstock 3 in a work engaging direction may be limited according to location of stop 21a on rod 21.

From the foregoing description it will be apparent that four shafts or equivalents extending out of the headstock 2 provide the necessary movements for the thread-cutting apparatus described. These shafts are respectively the spindle 7, the feed screw 8 which moves the compound rest 4 along the lathe, a splined shaft 62 which drives the relieving mechanism 60 and the reciprocating rod 50 which reciprocates the rack support 35. The motions of three of the shafts, namely, spindle 7, splined shaft 62, and reciprocating rod 50 are mutually related by interconnecting apparatus within the headstock.

The interconnections between these various shafts, as well as the thread-cutting method, will best be understood by reference in Fig. 1 which is a pictorial view of all major moving elements of this thread-cutting apparatus except the elements producing conventional feeding of the compound rest and transverse movement of the tool post. Primary power is supplied to the apparatus through a belt driven pulley 101 which is suitably secured to one end of a shaft 190 (Fig. 5) which is suitably rotatably mounted in the upper portion of the headstock 2. At the other end of the shaft 190 a conventional clutch 102 permits a controlled driving connection of the shaft 190 to a shaft 103. A hand lever 191 (Fig. 2) is provided on the exterior of headstock 2 and is operatively connected to clutch 102 by suitable linkage. The shaft 103 is rotatably supported in suitable bearings in the headstock 2. A pinion 104 is secured to the other end of shaft 103 and drives a large gear 105. The gear 105 is in turn keyed to one end of a crank shaft 195 which is mounted in suitable bearings in the headstock. On the other end of the crank shaft 195, a pinion 106 is secured thereto and drives thru an idler gear a gear 107 which is keyed to the end of splined shaft 62 which projects out of the headstock 2. Suitable bearing support is of course provided in the sidewall of headstock 2 for splined shaft 62.

A connecting rod 194 connects the crank shaft 195 to a drum 215 which is freely mounted on a horizontal shaft 110 which is an integral extension of spindle 7. A pair of lugs 215a and 215b project outwardly from the periphery of drum 215 and connecting rod 194 is pivotally mounted between these lugs on a pin 218. This crank connection thus imparts an oscillating motion to the shaft 110. For cutting threads on a three step breech block 6, the relationship of the connecting rod 194 and the drum 215 are such as to produce an angular oscillation of 32°, but it is apparent that such oscillation can be made to cover any desired angular extent.

An indexing mechanism 196 interconnects the reciprocating drum 215 to the spindle 7 and hence oscillates the spindle over a 32° path. The indexing mechanism 196 will not be described in detail at this point, it being sufficient to state that its function is to automatically adjust the angular relationship between the breech block 6 mounted on the spindle 7 with respect to the reciprocating drum 215 and thereby bring successive steps of the breech block 6 into engagement with the cutter 30.

On the left hand end of the oscillating shaft 110 as viewed in Fig. 4 there are provided a plurality of threaded sections 111 and 112 of different pitches. The function of either the threaded sections 111 or 112 is to determine the pitch and the direction, i. e., left or right hand, of the threads to be cut on a work piece such as the breech block 6. It is apparent that additional threaded sections similar to 111 and 112 and having different pitch and direction of threads may be provided on the shaft 110 permitting the apparatus to be readily adjusted to cut as many threads of different characteristics as desired.

Split nuts 113 and 114 are respectively provided to engage the threads 111 and 112. The ends of such nuts are secured together by suitable bolts 113a and 114a respectively. Vertical slots 115 are provided on each side of the periphery of the nut 113 and vertical slots 116 are provided in a similar location on the periphery of the nut 114. A vertical yoke 117 is provided having a rounded top end 117a in engagement with the slots 115. The bottom rounded end of yoke 117 engages in a slotted collar 119 which may be pinned to the reciprocating rod 50. A vertical yoke 118 is similarly arranged with respect to the slots 116 in split nut 114 and slotted collars 120 also mounted on reciprocating rod 50.

Suitable horseshoe-like members 117c and 118c are respectively provided between the rounded top ends 117a and 118a of yokes 117 and 118 and the slots 115 and 116. Other forked members are also provided between the bottom rounded ends of yokes 117 and 118 and the collars 119 and 120. Such yokes eliminate single side contact at these surfaces. In the center of yokes 117 and 118 there are respectively provided ball bearing bushings 117b and 118b. The yokes are respectively pivotally secured to the headstock frame by bolt members 117e and 118e which pass thru the bushings 117b and 118b.

As has already been stated in operation of the apparatus the shaft 110 continually oscillates over a 32° angle. Accordingly the split nuts 113 and 114 will move longitudinally with respect to the shaft 110 at a rate and direction dependent upon the pitch and direction of the threads 111 and 112 respectively. Such movement will not have any effect on reciprocating rod 50 unless either the slotted collar 119 or 120 is secured to the reciprocating rod 50. A single pin 121 is provided for such purpose and if inserted thru suitable holes in the slotted collar 119 and reciprocating rod 50 then the reciprocating rod 50 will reproduce the movement of the split nut 113, but of course in the opposite direction. If the pin 121 is inserted thru suitable holes in the collar 120 and reciprocating rod 50, then reciprocating rod 50 will be reciprocated synchronously but in opposite direction with the movements of the split nut 114 with respect to the shaft 110. Since the rack support 35 is rigidly secured to the reciprocating rod 50 with respect to movements of that rod along its axis the rack support 35 will also reciprocate synchronously with the movement of the selected one of the split nuts and hence reciprocate synchronously with the oscillation of the spindle 7 and the breech block 6. A slight synchronous rotary oscillation is thereby imparted to the cutter 30 due to the gear connection between the rack 36 and gear 32 on cutter shaft 31. All of the gear connections between a selected split nut which is 113 and the cutter 30 have teeth identical in pitch to the pitch of the teeth on the cutter 30 and hence to the pitch of the threads which will be cut on the stepped surface of the breech block 6. The lead of such threads cut is determined by the lead of the threaded section 111. It will be apparent later that the rack 36 determines the pitch of the threads to be cut.

If it is desired to cut threads having a different pitch and lead, for example, a thread having a lead corresponding to that of threaded section 112 and a pitch corresponding to that of rack 37 then the split nut 114 is operatively connected to the reciprocating rod 50 by the pinning of slotted collar 120 to the reciprocating rod 50 by pin 121. The rack support 35 is withdrawn and replaced in the manner already described so that now the rack 37 engages the gear 33 on the cutter shaft 31. If a cutter 30 having teeth corresponding in pitch to that of the rack 37 is placed on cutter shaft 31 then the apparatus will cut the desired threads. Hence threads of various pitch and lead and either right handed or left handed may be cut with this apparatus by making minor adjustments similar to those described.

Simultaneously with the motions already described the relieving mechanism 60 is in operation, being driven by the splined shaft 62. From the already described connections of the splined shaft 62 to the main power source it is apparent that by proper selection of the gearing ratios between gears 106 and 107 and beveled gears 63 and 64 it is possible to rotate cam 66 synchronously with the reciprocation of the work piece 6 and at such a rate that the cam 66 completes one revolution in each period of oscillation of the breech block 6. Cam 66 is angularly located on the vertical stud shaft 65 so that the high portion of the cam engages the roller 71d during the counterclockwise oscillation of the breech block 6 as viewed in Fig. 1. Hence the wedge 71 is forced inwardly and in turn forces the wedge block 69 in a direction parallel with the axis of cross feed screw 9. Hence the motion of the block 69 is imparted to cross feed screw 9 and the entire tool rest is moved slightly in a work engaging direction. On the clockwise return movement of the breech block 6, the low portion of the cam 66 comes into engagement with the roller 71d permitting the wedge 71 to be retracted by the wedge spring 72 and in turn the cross feed screw 9 moved in a relieving direction by the relieving spring 73.

It will therefore be apparent that the operator of the machine by manual operation of the cross feed screw 9 need only move the tool post slightly short of the position where the cutter will cut the desired depth of thread on a stepped surface of the breech block 6. Then upon setting the machine in operation thru clutch 102, the relieving mechanism will move the cutter slightly forward, in fact a known amount, and the initial cut is made by the movement of the breech block 6 against the cutter in a counterclockwise direction as viewed in Fig. 8. At the completion of 32° of movement in such direction the breech block 6 reverses direction and begins to return to its initial position. At this point the relieving mechanism backs off the tool post 5 slightly so that the teeth of cutter 30 do not, during the reverse movement of the breech block 6, bind in the cuts already made. This relieving feature of course prolongs the life of cutter 30.

It will be noted that the oscillation of the breech block is 2° greater than the maximum possible extent of the stepped surfaces, which is, of course, 30°. Actually each stepped surface is at least 3° shorter than 30° to provide cutter clearance. Hence no interference will be caused by permitting the breech block 6 to oscillate 32°. Furthermore this provides several degrees clearance on each end of the oscillation during which the relieving mechanism, which has some inherent time delay, may operate.

The large gear 105 (Fig. 6) has previously been mentioned as driving the crank shaft 195. The teeth on the periphery of the gear 105 also drive gear 122 which is secured to a shaft 123 suitably mounted within the headstock 2. The shaft 123 in turn furnishes power to the feed screw 8 thru a conventional reversing gear arrangement 124 and change speed gear box 125. Thus during operation of the machine the feed screw 8 is rotating at a constant selected rate and hence advancing the entire compound rest 4 along the bed of the machine, provided of course that the connecting mechanism between feed screw 8 and the compound rest is operative.

It should be noted however that the rack support 35 being secured to reciprocating rod 50 does not advance with the feeding movement of the tool post but slides with respect to the tool post on the dovetailed ribs 35b and 35c in the bottom of recess 5j in the tool post. Since the cutter shaft 31 moves with the tool post, the shaft 31 and hence the cutter 30 are rotated by the feeding movement due to the engagement between either the gear 32 and the rack 36 or the gear 33 and the rack 37 as the case may be. Hence the effect produced by the feeding movement is that the cutter 30 apparently rolls along the stepped surface of the breech block 6 and all of the teeth of the cutter 30 are thus consecutively brought into engagement with the particular stepped surfaces being cut. Thus the racks 36 or 37 act as forming gears and determine the pitch of the thread being cut. It should be remembered however that superimposed on this steady rolling movement of the cutter 30 along the axis of the breech block 6 is the lead producing reciprocating motion of the cutter 30 produced by the reciprocating rod 50 in the manner already described.

It is desired to emphasize that the thread-cutting method here employed is a radical departure from conventional methods. This is particularly illustrated by the very desirable feature of this method in that the pitch and lead of the threads produced is independent of the rate of feed of the compound rest along the work. Regardless of the rate of feeding movement, the only effect that such movement has is the rotation of the cutter shaft 31 and the cutter 30 by the forming rack 36. Hence no one tooth of the cutter 30 changes its path of engagement with the stepped surface due to the feeding movement of the compound rest. With a reversible rack support 35 as described capable of carrying two racks having teeth of different pitch, it is possible to cut four different types of threads on a work piece merely by selection of a proper yoke such as the yoke 117 and reversal of the rack support 35.

Upon the completion of the cutting of threads on one of the stepped surfaces of the breech block 6 the indexing mechanism 196 is manually energized to advance the breech block 6 30° with respect to the driving drum 215 to bring another stepped surface into position for cutting threads thereon. While any form of indexing mechanism may be utilized, we preferably employ an indexing mechanism similar to that shown and claimed in the co-pending application of Richard B. Stanley, Serial Number 501,710, filed September 9, 1943, now Patent Number 2,356,097, dated August 15, 1944, and assigned to the assignee of this application. The operation of such an indexing mechanism may be more readily understood by reference to Fig. 1 wherein the indexing mechanism is shown diagrammatically and removed from the surrounding mechanism in the headstock.

A cam plate 201 which is approximately the same diameter as drum 215 is freely mounted on the end of shaft 110 by means of a centrally bored hole (not shown) and is placed adjacent to driving drum 215. Cam plate 201 comprises a thin cylindrical plate and is provided with a transverse slot 211 on its outer periphery. A plunger 202 is suitably mounted in an integral bushing 2m (Fig. 5) in the front wall of the headstock 2 opposite the periphery of cam plate 201. The end of plunger 202 is suitably shaped for engagement in slot 211. The end of plunger 202 is also of sufficient width so as to engage a small portion of the outer surface of drum 215 adjacent cam plate 201. For actuating plunger 202 a hand plunger 204 is provided mounted in the forward portion of bushing 2m.

The plunger 204 comprises a cylindrical portion 205 projecting out of bushing 2m and a suitable hand knob 206 mounted on the projecting end. An axial hole 207 is provided in the inner end of cylindrical portion 205 to accommodate the end of plunger 202. A spring 208 is placed in the bottom of hole 207 and another spring 209 is placed about the end of plunger 202 adjacent plunger 204. When pressure is applied to knob 206, plunger 204 is forced inwardly compressing springs 208 and 209. Plunger 202 will in turn be forced into contact with drum 215 and into engagement with slot 211, when it is rotated into aligned position. A cam projection 233 secured to the outer periphery of drum 215, near the end of drum 215 and adjacent cam plate 201, is provided to disengage plunger 202 from slot 211 in cam plate 201.

A recess 212 (Fig. 7) is provided on the face of cam plate 201 adjacent drum 215 to receive the end 213b of a locking bar 213 to be described. A wedge-shaped arcuate cut 214 (Figs. 4 and 5) is provided in the non-adjacent face of cam plate 201. An arcuate slot 214a is provided in cam plate 201 co-extensive with the cut 214.

Near the spindle end of shaft 110, adjacent the opposite side of drum 215, an index plate 200 is secured to the shaft 110. On the surface of plate 200 adjacent drum 215 there are provided equally spaced tapered holes 220 (Fig. 7) extending around the periphery of plate 200. The number of such holes varies with the number of indexing operations desired. Since there are twelve stepped surfaces there are twelve such holes 220 provided spaced 30° apart.

On the periphery of index plate 200 there are mounted a plurality of cam dogs 221. Eleven such cam dogs are provided and with the exception of the number one and number eleven cam dog, these dogs are spaced 30° apart around the periphery of index plate 200. The angular distance between number one cam dog and number eleven will thus be 60°. Each cam dog 221 except number one is pivotally mounted by a bolt 249 in a recess 248 in the periphery of index plate 200. Each of the cam dogs 221 is provided with a single sloping cam surface 222 (Figs. 1 and 4) on one edge which projects beyond index plate 200. The side of each cam dog 221 opposite the sloped cam surface 222 is in abutment with one side of recess 248. A torsion spring 250 (Fig. 5) is suitably mounted around each bolt 249 and biases each dog 221 into the abutting position with respect to the side of each recess 248. The remaining side surfaces of each dog 221 are arcuately shaped permitting the dog to be pivoted in direction away from abutment against the side of each recess 248 and hence stressing torsion spring 250. The number one cam dog is however rigidly secured to the periphery of index plate 200 and has a sloped cam surface 222 identical to that on the other cam dogs 221 plus an oppositely sloped cam surface 251.

Near the periphery of driving drum 215 there is provided a transverse hole 224 parallel to the axis of the drum and of suitable shape to accommodate an indexing plate locking pin 225. One end 225a of pin 225 is tapered to engage any one of the twelve tapered index holes 220 provided on the inside surface of index plate 200 adjacent drum 215. Shank 226 of pin 225 is of somewhat reduced diameter and passes thru hole 224 in drum 215 out thru arcuate slot 214a in cam plate 201 and terminates in a head 228, the under surface of which is sloped to conform to the surface of arcuate cut 214 in cam plate 201. A spring 229 surrounding reduced shank portion 226 of pin 225 is placed within a suitably counterbored portion of hole 224 and bears against the somewhat larger diameter of the tapered end of pin 225 to bias pin 225 into engagement with one of the tapered holes 220 of index plate 200.

A locking bar 213 comprising a narrow rectangular member is slidably mounted in a slot 242 provided in the periphery of driving drum 215, running across the drum and parallel to the axis of the drum. The end 213a of the locking bar 213 projects past the drum somewhat, overhanging the index plate 200. Depending from the end 213a of locking bar 213 which overhangs the index plate 200 is a roller 230 which is secured to locking bar 213 by a bolt 231 in a manner to permit the roller 230 to rotate freely. A spring 232 is provided within a suitable recess in drum 215 and bears against a raised shoulder on the locking bar 213 to bias the locking bar against the inner surface of the cam plate 201. A cover plate 243 is secured to the periphery of drum 215 by suitable bolts, covering the slot 242 and hence retaining locking bar 213 within the slot 242. As was previously mentioned, the other end 213b of locking bar 213 projects past the other side of drum 215 and can be engaged in the recess 212 in cam plate 201. It will be apparent that the length of locking bar 213 is such that it can engage in recess 212 only when it is not engaged by a cam dog 221.

A spring 234 (Figs. 4 and 7) is connected between drum 215 and cam plate 201 in such a manner as to resist clockwise relative movement of the drum 215 with respect to the cam plate 201 as viewed in Fig. 7. An arcuate slot 244 is provided in the surface of drum 215 adjacent cam plate 201 and spring 234 is inserted in the slot 244 and secured to one end thereof. A square stud 245 suitably secured to cam plate 201 projects into slot 244 and one end of spring 234 is secured to one side of the stud 245. Due to the fact that cam plate 201 abuts against drum 215 the spring 234 is thereby retained in slot 244.

Adjacent the right hand face of index plate 200 as viewed in Figs. 4 and 5, a bevel gear 238 is mounted on shaft 110 and suitably secured to index plate 200 and spindle 7. The bevel gear 238 is engaged by a small bevel gear 237 which in turn is secured to a shaft 246 which is suitably rotatably supported in the headstock frame and projects thru the headstock 2. The shaft 246 is driven thru a conventional unidirectional escapement clutch and friction brake 236 which connects with a manually operated crank handle 235. The clutch 236 permits the index plate 200 to be rotated by handle 235 only in a counterclockwise direction as viewed in Fig. 7. A dial indicator 239 may also be mounted on the exterior of headstock 2 and connected by suitable gearing to shaft 246 to provide a visual indication of the angular position of the apparatus.

The work supporting spindle 7, as has already been mentioned, is rotatably mounted in a bushing 2f provided in the wall of the headstock 2. The spindle 7 is secured in bushing 2f by a collar 7e (Fig. 4) threaded on the periphery of the spindle within headstock 2. Suitable keys 247 insure a rigid connection between spindle 7, bevel gear 238 and index plate 200.

In the initial position of the indexing mechanism the number one dog 221 is located adjacent to the roller 230 on locking bar 213. This initial location is such that the counterclockwise movement of the spindle 7 on the cutting stroke will bring the number one cam dog 221 past the roller 230 after about 10° of movement. In such position of the indexing mechanism the pin 225 should also be in engagement with the first of holes 220 in the index plate 200. Hence the head 228 of pin 225 lies in the deepest part of the cut 214 in cam plate 201. Driving power is thus transmitted by the pin 225 from the oscillating drum 215 to the index plate 200 and hence to the spindle 7. In such position, the end 213b of locking bar 213 is out of alignment with recess 212 in cam plate 201 by an angular distance less than or equal to the angular extent of oscillation of the drum 215. This misalignment is in a clockwise direction as viewed in Fig. 7. The slot 211 in cam plate 201 is so placed as to come into aligned position with respect to plunger 202 near the end of each counterclockwise oscillation of drum 215 as viewed in Fig. 7.

To automatically index the drum 215 with respect to spindle 7 while drum 215 is oscillating, hand knob 206 is manually forced inwardly which compresses springs 208 and 209 and plunger 202 is forced against the surface of cam plate 201. Plunger 202 then engages transverse slot 211 in cam plate 201 at the end of the counterclockwise stroke of drum 215 and holds cam plate 201 stationary. As driving drum 215 is oscillated (clockwise as viewed in Fig. 7) the head 228 of pin 225 is forced to ride along the outwardly sloped surface of the cut 214 in cam plate 201 because cam plate 201 is held stationary. As the head 228 of pin 225 rides along the sloped surface of cut 214, pin 225 is retracted and the tapered end of pin 225 is withdrawn from the first of the tapered holes 220 in index plate 200 and spring 229 is compressed. At the moment pin 225 is completely withdrawn from hole 220 drum 215 has almost completed its clockwise stroke. Index plate 200 and hence spindle 7 are disconnected from drum 215 and cease to move when pin 225 is withdrawn from hole 220 due to friction brake 236 and the friction on the selected lead nut 113 or 114.

During this clockwise stroke of the driving drum 215 the end of locking bar 213 has been bearing against the inside surface of cam plate 201. Just prior to the end of the clockwise stroke the locking bar 213 becomes aligned with and is forced into recess 212 of cam plate 201 by the bias of spring 232. Concurrently cam 233 forces out plunger 202 from slot 211. Cam plate 201 is thus held in locked relation to driving drum 215 and for the moment becomes an integral part with driving drum 215. The springs 208 and 209 cushion the hand of the operator on knob 206 from any shock resulting from disengagement of plunger 202 from the cam plate. Cam plate 201 is now secured to driving drum 215 and is free to move with driving drum 215 on its counterclockwise stroke.

During the preceding clockwise stroke cam plate 201 had been held stationary with respect to driving drum 215 which has been moved relative to it: The spring 234 (Fig. 7) thus has been tensioned by this movement. The tension of spring 234 exists while cam plate 201 and driving drum 215 are held in locked relation by locking bar 213.

The next counterclockwise stroke of driving drum 215 is now started and after a short movement, about 10° of this stroke, so that pin 225 is well past number one hole 220 in index plate 200, roller 230 on locking bar 213 is engaged by the cam surface 222 of number one cam dog 221 on the periphery of index plate 200. This engagement forces locking bar 213 out of engagement with recess 212. Then cam plate 201 is freed from drum 215 and under the bias of spring 234 moves in the opposite direction from the counterclockwise stroke of driving drum 215. Such action permits locking pin 225 to slide down the arcuate cut 214 provided in cam plate 201 under the bias of spring 229 and thus enters into engagement with the inner surface of index plate 200. The pin 225 then rides along this surface until the completion of the counterclockwise stroke of the drum and at this point the index pin 225 is aligned with and enters into the second hole 220 which had been brought into its position by the previous clockwise motion of the index plate 200 produced by the drum 215 in the manner described.

The spindle 7 thus has been advanced or indexed in a clockwise direction with respect to the drum 215 by the 30° angular distance between holes 220. Hence the next stepped surface is brought into proper position for the cutting of threads thereon in the manner already described. The indexing operation is performed eleven times to bring each of the stepped surfaces into position for the cutting of threads. Further indexing of the mechanism after the eleventh time is prevented due to the omission of a cam dog 221 in the space between the number one dog and number eleven dog. Because of such omission after the eleventh index the locking bar 213 cannot be automatically disengaged from cam plate 201. Hence no driving connection between the drum 215 and spindle 7 is effected and the operator is thus informed that the indexing has completed one cycle. The indexing apparatus is then returned to the starting position by rotating the crank handle 235 which engages the unidirectional clutch 236 (Fig. 5) and revolves the index plate in counterclockwise direction as viewed in Fig. 7 by means of the gears 237 and 238 attached to the crank handle and to the face of the index plate 200 respectively. All of the cam dogs 221 except number one have no effect on locking bar 213, pivoting around their mounting bolts 249 upon striking roller 230. Thus the cam surface 251 of the number one cam dog 221 strikes the roller 230 and locking bar 213 is disengaged from cam plate 201. Cam plate 201 then revolves under force of tensioned spring 234 and pin 225 engages the number one index hole 220 in index plate 200 thus placing the machine in its original starting position.

It should be noted that the rotary cutter 30 shown herein has a segmental cut 30c in it. The remaining cutting periphery of cutter 30 is greater in length than the length of the stepped surfaces of the breech block 6. Hence the cutter 30 can produce a thread extending the length of the breech block. When it is time to cut threads in the stepped surface 6d of the breech block 6 on which the rotating cam lug 6b is provided then thru the clearance provided by the segmental cut 30c, the cutter can be started immediately adjacent the cam lug 6b and step 6d threaded without difficulty. For this purpose a second key location is provided in cutter shaft 31 and is so positioned with respect to the key notch in cutter 30 that the segmental cut 30c fits around cam lug 6b.

If desired the threads may be rough-formed on each of the stepped surfaces of the breech block by the cutter 30 in the manner described. The finishing of the threads may then be accomplished by the same apparatus by the removal of the rotary cutter 30 and the substitution of a linear thread chaser 80 (Fig. 17). The thread chaser 80 is provided with a centrally located hole 81 and is secured to the cutter shaft 31 by means of the key 30a and the nut 30b. In this position the back end of the chaser 80 lies in abutment with an upstanding integral rib 82 provided on the top of the tool post 5. Obviously in using the chaser 80 no rotary motion, such as existed when using rotary cutter 30, or feeding motion of the compound rest can be permitted. Hence the rack support 35 is rigidly secured to the compound rest by means of two pins 83 and 84 which pass thru holes 4g and 4h respectively in rack support 35 and engage in holes 5m and 5n provided in tool post 5. The pin 83 (Fig. 18) is used as a locating pin while the pin 84 (Fig. 19) has a tapered cross section and effects the rigid connection between the rack support 35 and the tool post 5 thru its wedging action when inserted in the described holes. Feeding motion is prevented by releasing the halfnut connection between feed screw 8 and compound rest 4.

The operation of the machine when using the thread chaser 80 is identical to that described in connection with use of the cutter 30 with the exception that the entire tool post 5 is reciprocated by the reciprocating rod 50 in place of the oscillation of the cutter shaft 31 and the feed screw 8 is not connected. Hence the teeth of the chaser 80 will follow a path identical in pitch and lead to that followed by the teeth of the rotary cutter 30. Thus the roughed out threads on the breech block blank 6 will be accurately engaged by the teeth of the chaser 80 and the teeth can then be finished by the chaser. No difficulty is encountered in using the chaser on the stepped surface 6d on which the cam lug 6b is mounted since the compound rest can be moved along the lathe bed 1 by engaging feed screw 8 to a point where the chaser 80 will clear the cam lug 6b. It is of course possible to perform the rough thread cutting with a linear cutter, similar to thread chaser 80, instead of rotary cutter 30.

It should be distinctly understood that the thread-cutting method described herein is not limited to the cutting of threads on a stepped breech block but may be adapted to the cutting of threads on any type of work piece. The cutting of threads on the breech block merely represents a particularly difficult problem solved by this thread-cutting method.

We claim:

1. A machine tool comprising a spindle adapted to rigidly support a workpiece, means for rocking said spindle thru a limited arc, a support arranged to hold a cutting tool in engagement with the surface of the workpiece during one direction of said rocking movement, means moving said support to disengage said cutting tool from the surface of said workpiece during the return rocking movement of said spindle, said last mentioned means comprising means for mounting said support for movement perpendicular to the surface of said workpiece, and cam means operating to impart a transverse reciprocating motion to said support, said cam means being driven synchronously with the rocking movement of the spindle.

2. A machine tool comprising a spindle adapted to rigidly support a workpiece, means for rocking said spindle thru a limited arc, means for supporting a circular toothed cutter with a portion of its cutting periphery in engagement with the surface of the workpiece during one direction of said rocking movement of the spindle, and means for synchronizing the angular position of said circular cutter about its axis with respect to the rocking movement of said spindle.

3. A machine tool comprising a spindle adapted to rigidly support a workpiece, means for rocking said spindle thru a limited arc, a circular toothed cutter mounted with a portion of its cutting periphery in engagement with the surface of the workpiece during one direction of rocking movement of the spindle, and means for imparting a rotational and translational movement to said cutter whereby the cutting periphery of said cutter will effect a rolling engagement with the surface of said workpiece.

4. A thread cutting machine comprising a spindle adapted to rigidly support a workpiece, means for rocking said spindle thru a limited arc, a support arranged to hold a thread forming tool in engagement with the surface of said workpiece during one direction of rocking movement of the spindle, and means to impart a reciprocating translational movement to said support parallel to the rocking axis of said spindle, said movement being synchronized with the rocking movement of the spindle whereby the thread forming tool engages the surface of the workpiece along a helical path.

5. A thread cutting machine comprising a spindle adapted to rigidly support a workpiece, means for rocking said spindle thru a limited arc, a support arranged to hold a thread cutting tool in engagement with the surface of said workpiece, said support being mounted for translational movements, both parallel to the rocking axis of said spindle and perpendicular to the rocking axis of said spindle, means to reciprocatingly move said support in said direction perpendicular to the rocking axis of said spindle, said last mentioned means operating synchronously with the rocking movement of the spindle whereby said thread cutting tool engages the surface of said workpiece only during one direction of rocking motion of said spindle, and means to reciprocatingly move said support parallel to the rocking axis of said spindle, said last mentioned means operating synchronously with the rocking motion of the spindle, whereby the thread cutting tool engages the surface of the workpiece along a helical path.

6. A thread cutting machine comprising a spindle adapted to rigidly support a workpiece, means for rocking said spindle thru a limited arc, a circular toothed cutter, a support arranged to hold said cutter with a portion of its periphery in engagement with the workpiece during one direction of rocking movement of the spindle, and means for imparting an oscillating movement to said cutter about its center, said oscillating movement being synchronized with the rocking movement of the spindle, whereby the teeth of said cutter engage the surface of the workpiece along a helical path.

7. A thread cutting machine comprising a spindle adapted to rigidly support a workpiece, means for rocking said spindle thru a limited arc, a circular toothed cutter, a support arranged to hold said cutter with a portion of its periphery in engagement with the workpiece during one direction of rocking movement of the spindle, means for imparting an oscillating movement to said cutter about its center, said oscillating movement being synchronized with the rocking movement of the spindle whereby the teeth of said cutter engage the surface of the workpiece along a helical path, and means for imparting a combined unidirectional rotational and translational movement to said cutter whereby the teeth of said cutter effect a rolling engagement with the surface of the workpiece.

8. A thread cutting machine comprising a spindle adapted to rigidly support a workpiece, means for rocking said spindle thru a limited arc, a circular toothed cutter, a support for said cutter mounted for translational movement perpendicular to the rocking axis of said spindle, means for reciprocating said support along said path of movement, said last mentioned means operating synchronously with the rocking movement of the spindle whereby said cutter is brought into engagement with the surface of the workpiece during one direction of rocking motion of said spindle, and means for imparting a limited oscillating movement to said cutter about its center, said oscillating movement being synchronized with the rocking movement of the spindle, whereby the teeth of said cutter engage the surface of the workpiece along a helical path.

9. A thread cutting machine comprising a spindle adapted to rigidly support a workpiece, means for rocking said spindle thru a limited arc, a circular toothed cutter, a support for said cutter mounted for translational movement perpendicular to the rocking axis of said spindle, means to reciprocate said support along said path of movement, said last mentioned means operating synchronously with the rocking movement of the spindle whereby said cutter is brought into engagement with the surface of the workpiece only during one direction of rocking motion of said spindle, means for imparting a limited oscillating movement to said cutter about its center, said oscillating movement being synchronized with the rocking movement of the spindle whereby the teeth of said cutter engage the surface of the workpiece along a helical path, and means for imparting a combined unidirectional rotational and translational movement to said cutter whereby the teeth of said cutter effect a rolling engagement with the surface of the workpiece.

10. A machine tool comprising a spindle adapted to rigidly support a workpiece, means for rocking said spindle thru a limited arc, a support arranged to hold a cutting tool in engagement with the surface of the workpiece during one direction of said rocking movement, and means for imparting a constant speed unidirectional movement to said support parallel to the rocking axis of said spindle.

11. A machine tool comprising a spindle adapted to rigidly support a workpiece, means for rocking said spindle thru a limited arc, a support arranged to hold a cutting tool in engagement with the surface of the workpiece during one direction of said rocking movement, means moving said support to disengage said cutting tool from the surface of said workpiece during the return rocking movement of said spindle, and means for imparting a constant speed unidirectional movement to said support parallel to the rocking axis of said spindle.

12. A machine tool comprising a spindle adapted to rigidly support a workpiece, means for rocking said spindle thru a limited arc, a support arranged to hold a cutting tool in engagement with the surface of the workpiece during one direction of said rocking movement, means moving said support to disengage said cutting tool from the surface of said workpiece during the return rocking movement of said spindle, said last mentioned means comprising means for mounting said support for movement perpendicular to the rocking axis of said spindle and cam means operating to impart a transverse reciprocating motion to said support along said path of movement, said cam means being driven synchronously with the rocking movement of the spindle, and means for imparting a constant speed unidirectional movement to said support parallel to the rocking axis of said spindle.

13. A machine tool comprising a spindle adapted to rigidly support a workpiece, means for rocking said spindle thru a limited arc, means for supporting a circular toothed cutter with a portion of its cutting periphery in engagement with the surface of the workpiece during one direction of rocking movement of the spindle, and means for advancing said supporting means parallel to the rocking axis of said workpiece.

14. A thread cutting machine comprising a spindle adapted to rigidly support a workpiece, means for rocking said spindle thru a limited arc, a support movable parallel to the rocking axis of said spindle, a shaft vertically mounted in said support, a circular toothed cutter mounted on one end of said shaft and arranged to engage the surface of the workpiece during one direction of rocking movement of the spindle, and gearing means for oscillating said shaft synchronously with the rocking movement of said spindle whereby the teeth of said cutter engage the surface of said workpiece along a helical path.

15. A thread cutting machine comprising a spindle adapted to rigidly support a workpiece, means for rocking said spindle thru a limited arc, a support movable parallel to the rocking axis of said spindle, a shaft vertically mounted in said support, a circular toothed cutter mounted on one end of said shaft and arranged to engage the surface of said workpiece during one direction of rocking movement of the spindle, a gear on the other end of said shaft, a rack cooperating with said gear slidably mounted in said support, and means for reciprocating said rack synchronously with the rocking movement of said spindle whereby the teeth of said cutter engage the surface of said workpiece along a helical path.

16. A thread cutting machine comprising a spindle adapted to rigidly support a workpiece, means for rocking said spindle thru a limited arc, a support movable parallel to the rocking axis of said spindle, a shaft mounted in said support, a pair of gears on one end of said shaft, said gears having different numbers of teeth, a rack support slidably mounted within said support, a pair of racks mounted on said rack support, one of said gears being engaged by one of said racks in one position of the rack support in said support and the other rack constructed and arranged to engage the other gear in a reversed position of the rack support in said support, a circular toothed cutter mounted on the other end of said shaft and arranged to engage the surface of said workpiece during one direction of rocking movement of the spindle, the number of teeth on said cutter being determined by the said selected gear and rack, and means for reciprocating said rack support synchronously with the rocking movement of said spindle whereby the teeth of said cutter engage the surface of said workpiece along a helical path.

17. A thread cutting machine comprising a spindle adapted to rigidly support a workpiece, means for rocking said spindle thru a limited arc, a support movable parallel to the rocking axis of said spindle, a first shaft mounted in said support, a circular toothed cutter mounted on one end of said shaft and arranged to engage the surface of said workpiece during one direction of rocking movement of the spindle, a gear on the other end of said shaft, a rack cooperating with said gear slidably mounted in said support, a second shaft rocking synchronously with said spindle, a threaded section on said second shaft, a nut engaging said threaded section and thereby receiving a reciprocating translational movement, and a pivoted rocker arm having one end secured to said nut and the other end cooperating with said rack to impart a reciprocating motion to said rack synchronous with the rocking movement of said spindle whereby the teeth of said cutter engage the surface of said workpiece along a helical path.

18. In a lathe having a bed, a headstock, and a compound rest movable along the bed, the improvement comprising a spindle mounted in the headstock and adapted to rigidly support a workpiece, means in the headstock for rocking the spindle thru a limited arc, a support mounted on the compound rest for movement perpendicular to the lathe bed, a shaft vertically mounted in said support, a circular toothed cutter mounted on one end of said shaft and arranged to engage the surface of the workpiece, gearing means for oscillating said shaft synchronously with the rocking movement of said spindle whereby the teeth of said cutter engage the surface of said workpiece along a helical path, and means reciprocating said support in a direction perpendicular to the rocking axis of said spindle, said last mentioned means operating synchronously with the rocking movement of said spindle whereby the teeth of said cutter engage the surface of the workpiece only during one direction of rocking movement of the spindle.

19. A thread cutting machine comprising a spindle adapted to rigidly support a workpiece, means for rocking said spindle thru a limited arc, a support movable parallel to the rocking axis of said spindle, a shaft mounted in said support, a circular toothed cutter mounted on one end of said shaft and arranged to engage the surface of said workpiece during one direction of rocking movement of the spindle, a gear on the other end of said shaft, a rack cooperating with said gear slidably mounted in said support, means for reciprocating said rack synchronously with the rocking movement of said spindle whereby the teeth of said cutter engage the surface of said workpiece along a helical path, and means for imparting a constant speed unidirectional movement to said support relative to both the workpiece and said rack whereby the teeth of said cutter effect a rolling engagement with the surface of the workpiece.

20. A thread cutting machine comprising a spindle adapted to rigidly support a workpiece, means for rocking said spindle thru a limited arc, a support movable parallel to the rocking axis of said spindle, a shaft mounted in said support, a pair of gears on one end of said shaft, said gears having different numbers of teeth, a rack support slidably mounted within said support, a pair of racks mounted on said rack support, one of said gears being engaged by one of said racks in one position of the rack support in said support and the other rack constructed and arranged to engage the other gear in a reversed position of the rack support in said support, a circular toothed cutter mounted on the other end of said shaft and arranged to engage the surface of said workpiece during one direction of rocking movement of the spindle, the number of teeth on said cutter being determined by the said selected gear and rack, means for reciprocating said rack support synchronously with the rocking movement of said spindle whereby the teeth of said cutter engage the surface of said workpiece along a helical path, and means for imparting a constant speed unidirectional movement to said support relative to both the workpiece and said rack support whereby the teeth of said cutter effect a rolling engagement with the surface of the workpiece.

21. A thread cutting machine comprising a spindle adapted to rigidly support a workpiece, means for rocking said spindle thru a limited arc, a support movable parallel to the rocking axis of said workpiece, a first shaft vertically mounted in said support, a circular toothed cutter mounted on one end of said shaft and arranged to engage the surface of said workpiece during one direction of rocking movement of the spindle, a gear on the other end of said shaft, a rack cooperating with said gear slidably mounted in said support, a second shaft rocking synchronously with said spindle, a threaded section on said second shaft, a nut engaging said threaded section and thereby receiving a reciprocating translational movement, a pivoted rocker arm having one end secured to said nut and the other end cooperating with said rack to impart a reciprocating motion to said rack synchronous with the rocking movement of said spindle whereby the teeth of said cutter engage the surface of said workpiece along a helical path, and means for imparting a constant speed unidirectional movement to said support relative to both the workpiece and said rack whereby the teeth of said cutter effect a rolling engagement with the surface of the workpiece.

22. In a lathe having a bed, a headstock and a compound rest movable along the bed, the improvement comprising a spindle mounted in the headstock and adapted to rigidly support a workpiece, means in the headstock for rocking said spindle thru a limited arc, a support mounted on the compound rest for movement perpendicular to the rocking axis of said spindle, a shaft mounted in said support, a circular toothed cutter mounted on one end of said shaft and arranged to engage the surface of said workpiece, a gear on the other end of said shaft, a rack cooperating with said gear slidably mounted in said support, means for reciprocating said rack synchronously with the rocking movement of said spindle whereby the teeth of said cutter engage the surface of said workpiece along a helical path, and means reciprocating said support in a direction perpendicular to the lathe bed, said last mentioned means operating synchronously with the rocking movement of said spindle whereby the teeth of said cutter engage the surface of the workpiece only during one direction of rocking movement of the spindle.

23. In a lathe having a bed, a headstock, and a compound rest movable along the bed, the improvement comprising a spindle mounted in the headstock and adapted to rigidly support a workpiece, means in the headstock for rocking said spindle thru an arc, a support mounted on the compound rest for movement perpendicular to the lathe bed, a shaft vertically mounted in said support, a circular toothed cutter mounted on one end of said shaft and arranged to engage the surface of said workpiece, a gear on the other end of said shaft, a rack cooperating with said gear slidably mounted in said support, a threaded shaft within the headstock rocking synchronously with said spindle, a nut engaging said threaded shaft and thereby receiving a reciprocating translational movement, a pivoted rocker arm having one end secured to said nut and the other end cooperating with said rack to impart a reciprocating motion to said rack synchronous with the rocking movement of said spindle whereby the teeth of said cutter engage the surface of said workpiece along a helical path, and means reciprocating said support in a direction perpendicular to the lathe bed, said last mentioned means operating synchronously with the rocking movement of said spindle whereby the teeth of said cutter engage the surface of the workpiece only during one direction of rocking movement of the spindle.

24. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a cutting tool in engagement with one of the stepped surfaces of the workpiece during one direction of the rocking movement, and means for rotationally indexing said spindle to bring successive stepped surfaces of the workpiece into position to be engaged by the cutting tool.

25. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a cutting tool in engagement with one of the stepped surfaces of the workpiece during the rocking movement, means for rotationally indexing said spindle to bring successive stepped surfaces of the workpiece into position to be engaged by the cutting tool, and means moving said support to disengage said cutting tool from the stepped surfaces of said workpiece during the return rocking movement of said spindle.

26. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a cutting tool in engagement with one of the stepped surfaces of the workpiece during the rocking movement, means for rotationally indexing said spindle to bring successive stepped surfaces of the workpiece into position to be engaged by the cutting tool, means moving said support to disengage said cutting tool from the stepped surfaces of said workpiece during the return rocking movement of said spindle, said last mentioned means comprising means for mounting said support for movement perpendicular to the stepped surfaces of said workpiece, and cam means operating to impart a transverse reciprocating motion to said support, said cam means being driven synchronously with the rocking movement of the spindle.

27. A machine for cutting threads on a workpiece having stepped partial cylindrical surfaces, comprising a spindle adapted to rigidly support such workpiece, means for rocking said spindle thru an arc at least equal to the arcuate extent of the stepped surfaces of the workpiece, means for supporting a circular toothed cutter with a portion of its cutting periphery in engagement with one of the stepped surfaces of the workpiece during one direction of rocking movement of the spindle, and means for rotationally indexing said spindle to bring successive stepped surfaces of the workpiece into position to be engaged by the said cutter.

28. A machine for cutting threads on a workpiece having stepped partial cylindrical surfaces comprising a spindle adapted to rigidly support such workpiece, means for rocking said spindle thru an arc at least equal to the arcuate extent of the stepped surfaces of the workpiece, a circular toothed cutter mounted with a portion of its cutting periphery in engagement with one of the stepped surfaces of the workpiece during one direction of rocking movement of the spindle, means for rotationally indexing said spindle to bring successive stepped surfaces of the workpiece into position to be engaged by said cutter, and means for imparting a rotational and translational movement to said cutter whereby the cutting periphery of said cutter will effect a rolling engagement with the surface of said workpiece.

29. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a support arranged to hold a thread forming tool in engagement with one of the stepped surfaces of the workpiece during one direction of rocking movement of the spindle, means for rotationally indexing said spindle to bring successive stepped surfaces of the workpiece into position to be engaged by said thread forming tool, and means to impart a reciprocating translational movement to said support parallel to the rocking axis of said spindle, said movement being synchronized with the rocking movement of the spindle whereby the thread forming tool engages the stepped surface of the workpiece along a helical path.

30. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a thread cutting tool in engagement with one of the stepped surfaces of the workpiece, means for rotationally indexing said spindle to bring successive stepped surfaces of the workpiece into position to be engaged by said tool, said support being mounted for translational movements, both parallel to the rocking axis of said spindle and perpendicular to the rocking axis of said spindle, means to reciprocatingly move said support in said direction perpendicular to the rocking axis of said spindle, said last mentioned means operating synchronously with the rocking movement of the spindle whereby said thread cutting tool engages a stepped surface of the workpiece only during one direction of rocking motion of said spindle, and means to reciprocatingly move said support parallel to the rocking axis of said spindle, said last mentioned means operating synchronously with the rocking motion of the spindle, whereby the thread cutting tool engages the stepped surfaces of the workpiece along a helical path.

31. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a circular toothed cutter, a support arranged to hold said cutter with a portion of its periphery in engagement with one of the stepped surfaces of the workpiece during one direction of rocking movement of the spindle, means for rotationally indexing said spindle to bring successive stepped surfaces of the workpiece into position to be engaged by said cutter, and means for imparting an oscillating movement to said cutter about its center, said oscillating movement being synchronized with the rocking movement of the spindle, whereby the teeth of said cutter engage a stepped surface of the workpiece along a helical path.

32. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a circular cutter, a support arranged to hold said cutter with a portion of its periphery in engagement with one of the stepped surfaces of the workpiece during one direction of rocking movement of the spindle, means for rotationally indexing said spindle to bring successive stepped surfaces of the workpiece into position to be engaged by said cutter, means for imparting an oscillating movement to said cutter about its center, said oscillating movement being synchronized with the rocking movement of the spindle whereby the teeth of said cutter engage the stepped surface of the workpiece along a helical path, and means for imparting a combined unidirectional rotational and translational movement to said cutter whereby the teeth of said cutter effect a rolling engagement with the stepped surface of the workpiece.

33. A machine for cutting threads on a workpiece having stepped, partial cylindrical surfaces, comprising a spindle adapted to rigidly support such workpiece, means for rocking said spindle thru an arc at least equal to the arcuate extent of the stepped surfaces of the workpiece, a circular toothed cutter, a support for said cutter mounted for translational movement perpendicular to the working axis of said spindle, means for reciprocating said support along said path of movement, said last mentioned means operating synchronously with the rocking movement of the spindle whereby said cutter is brought into engagement with one of the stepped surfaces of the workpiece during one direction of rocking motion of said spindle, means for rotationally indexing said spindle to bring successive stepped surfaces of the workpiece into position to be engaged by said cutter, and means for imparting a limited oscillating movement to said cutter about its center, said oscillating movement being synchronized with the rocking movement of said spindle whereby the teeth of said cutter engage a stepped surface of the workpiece along a helical path.

34. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a circular toothed cutter, a support for said cutter mounted for translational movement perpendicular to the rocking axis of said spindle, means to reciprocate said support along said path of movement, said last mentioned means operating synchronously with the rocking movement of the spindle whereby said cutter is brought into engagement with one of the stepped surfaces of the workpiece during one direction of rocking motion of said spindle, means for rotationally indexing said spindle to bring successive stepped surfaces of the workpiece into position to be engaged by said cutter, means for imparting a limited oscillating movement to said cutter about its center, said oscillating movement being synchronized with the rocking movement of the spindle whereby the teeth of said cutter engage a stepped surface of the workpiece along a helical path, and means for imparting a combined unidirectional, rotational and translational movement to said cutter whereby the teeth of said cutter effecting a rolling engagement with the stepped surface of the workpiece.

35. A machine for cutting threads on a workpiece having stepped, partial cylindrical surfaces comprising a spindle adapted to rigidly support a workpiece, means for rocking said spindle thru an arc at least equal to the arcuate extent of the stepped surfaces of the workpiece, a support arranged to hold a cutting tool in engagement with one of the stepped surfaces of the workpiece during one direction of said rocking movement, means for rotationally indexing said spindle to bring successive stepped surfaces of the workpiece into position to be engaged by the cutting tool, and means for imparting a constant speed unidirectional movement to said support parallel to the rocking axis of said spindle.

36. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a cutting tool in engagement with one of the stepped surfaces of the workpiece during one direction of the rocking movement, means for rotationally indexing said spindle to bring successive stepped surfaces of the workpiece into position to be engaged by said cutting tool, means moving said support to disengage said cutting tool from the stepped surface of said workpiece during the return rocking movement of said spindle, and means for imparting a constant speed unidirectional movement of said support parallel to the rocking axis of said spindle.

37. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of the workpiece, a support arranged to hold a cutting tool in engagement with one of the stepped surfaces of the workpiece during one direction of said rocking movement, means for rotationally indexing said spindle to bring successive stepped surfaces of the workpiece into position to be engaged by said tool, means moving said support to disengage said cutting tool from the stepped surface of said workpiece during the return rocking movement of said spindle, said last mentioned means comprising means for mounting said support for movement perpendicular to the rocking axis of said spindle and cam means operating to impart a transverse reciprocating motion to said support along said path of movement, said cam means being driven synchronously with the rocking movement of the spindle, and means for imparting a constant speed unidirectional movement to said support parallel to the rocking axis of said spindle.

38. A machine for cutting threads on a workpiece having stepped, partial cylindrical surfaces comprising a spindle adapted to rigidly support the workpiece, means for rocking said spindle thru an arc at least equal to the arcuate extent of the stepped surfaces of such workpiece, means for supporting a circular toothed cutter with a portion of its cutting periphery in engagement with one of the stepped surfaces of the workpiece during one direction of rocking movement of the spindle, means for rotationally indexing said spindle to bring successive stepped surfaces of the workpiece into position to be engaged by said cutter, and means for advancing said supporting means parallel to the rocking axis of said workpiece.

39. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a support movable parallel to the rocking axis of said spindle, a shaft vertically mounted in said support, a circular toothed cutter mounted on one end of said shaft and arranged to engage one of the stepped surfaces of the workpiece during one direction of rocking movement of the spindle, gearing means for oscillating said shaft synchronously with the rocking movement of said spindle whereby the teeth of said cutter engage the stepped surface of said workpiece along a helical path, and means for rotationally indexing said spindle to bring successive stepped surfaces of the workpiece into position to be engaged by said cutter.

40. In a lathe having a bed, a headstock, and a compound rest movable along the bed, the improvement comprising a spindle mounted in the headstock and adapted to rigidly support a workpiece having stepped, partial cylindrical surfaces, means in the headstock for rocking the spindle thru an arc at least equal to the arcuate extent of the stepped surfaces of the workpiece, a support mounted on the compound rest for movement perpendicular to the lathe bed, a shaft vertically mounted in said support, a circular toothed cutter mounted on one end of said shaft and arranged to engage the stepped surface of the workpiece, gearing means for oscillating said shaft synchronously with the rocking movement of said spindle whereby the teeth of said cutter engage one of the stepped surfaces of said workpiece along a helical path, means reciprocating said support in a direction perpendicular to the rocking axis of said spindle, said last mentioned means operating synchronously with the rocking movement of said spindle whereby the teeth of said cutter engage the stepped surface of the workpiece only during one direction of rocking movement of the spindle, and means for rotationally indexing said spindle to bring successive stepped surfaces of the workpiece into position to be engaged by said cutter.

41. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a support movable parallel to the rocking axis of said spindle, a shaft vertically mounted in said support, a circular toothed cutter mounted on one end of said shaft and arranged to engage one of the stepped surfaces of said workpiece during one direction of rocking movement of the spindle, a gear on the other end of said shaft, a rack cooperating with said gear slidably mounted in said support, means for reciprocating said rack synchronously with the rocking movement of said spindle whereby the teeth of said cutter engage the stepped surface of said workpiece along a helical path, and means for rotationally indexing said spindle to bring successive stepped surfaces of the workpiece into position to be engaged by said cutter.

42. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a support movable parallel to the rocking axis of said spindle, a shaft mounted in said support, a pair of gears on one end of said shaft, said gears having different numbers of teeth, a rack support slidably mounted within said support, a pair of racks mounted on said rack support, one of said gears being engaged by one of said racks in one position of the rack support in said support and the other rack constructed and arranged to engage the other gear in a reversed position of the rack support in said support, a circular toothed cutter mounted on the other end of said shaft and arranged to engage one of the stepped surfaces of said workpiece during one direction of rocking movement of the spindle, the number of teeth on said cutter being determined by the said selected gear and rack, means for reciprocating said rack support synchronously with the rocking movement of said spindle whereby the teeth of said cutter engage the stepped surface of said workpiece along a helical path, and means for rotationally indexing said spindle to bring successive stepped surfaces of the workpiece into position to be engaged by said cutter.

43. A machine for cutting threads on a workpiece having stepped, partial cylindrical surfaces comprising a spindle adapted to rigidly support such workpiece, means for rocking said spindle thru an arc at least equal to the arcuate extent of the stepped surfaces of the workpiece, a support movable parallel to the rocking axis of said spindle, a first shaft mounted in said support, a circular toothed cutter mounted on one end of said shaft and arranged to engage one of the stepped surfaces of said workpiece during one direction of rocking movement of the spindle, a gear on the other end of said shaft, a rack cooperating with said gear slidably mounted in said support, a second shaft rocking synchronously with said spindle, a threaded section on said second shaft, a nut engaging said threaded section and thereby receiving a reciprocating translational movement, a pivoted rocker arm having one end secured to said nut and the other end cooperating with said rack to impart a reciprocating motion to said rack synchronous with the rocking movement of said spindle whereby the teeth of said cutter engage the stepped surface of said workpiece along a helical path, and means for rotationally indexing said spindle to bring successive stepped surfaces of the workpiece into position to be engaged by said cutter.

44. A machine for cutting threads on a workpiece having stepped partial cylindrical surfaces comprising a spindle adapted to rigidly support such workpiece, means for rocking said spindle thru an arc at least equal to the arcuate extent of the stepped surfaces of the workpiece, a support movable parallel to the rocking axis of said spindle, a shaft mounted in said support, a circular toothed cutter mounted on one end of said shaft and arranged to engage one of the stepped surfaces of said workpiece during one direction of rocking movement of the spindle, a gear on the other end of said shaft, a rack cooperating with said gear slidably mounted in said support, means for reciprocating said rack synchronously with the rocking movement of said spindle whereby the teeth of said cutter engage the surface of said workpiece along a helical path, means for imparting a constant speed unidirectional movement to said support relative to both the workpiece and said rack whereby the teeth of said cutter effect a rolling engagement with the surface of the workpiece, and means for rotationally indexing said spindle to bring successive stepped surfaces of the workpiece into position to be engaged by said cutter.

45. A thread cutting machine comprising a spindle adapted to rigidly support a workpiece having stepped partial cylindrical surfaces, means for rocking said spindle thru a limited arc at least equal to the arcuate extent of the stepped surfaces of the workpiece, a support movable parallel to the rocking axis of said spindle, a shaft mounted in said support, a pair of gears on one end of said shaft, said gears having different numbers of teeth, a rack support slidably mounted within said support, a pair of racks mounted on said rack support, one of said gears being engaged by one of said racks in one position of the rack support in said support and the other rack constructed and arranged to engage the other gear in a reversed position of the rack support in said support, a circular toothed cutter mounted on the other end of said shaft and arranged to engage the surface of said workpiece during one direction of rocking movement of the spindle, the number of teeth on said cutter being determined by the said selected gear and rack, means for reciprocating said rack support synchronously with the rocking movement of said spindle whereby the teeth of said cutter engage the surface of said workpiece along a helical path, means for imparting a constant speed unidirectional movement to said support relative to both the workpiece and said rack support whereby the teeth of said cutter effect a rolling engagement with the surface of the workpiece, and means for rotationally indexing said spindle to bring successive stepped surfaces of the workpiece into position to be engaged by said cutter.

46. A thread cutting machine comprising a spindle adapted to rigidly support a workpiece having stepped partial cylindrical surfaces, means for rocking said spindle thru a limited arc at least equal to the arcuate extent of the stepped surfaces of the workpiece, a support movable parallel to the rocking axis of said spindle, a first shaft mounted in said support, a circular toothed cutter mounted on one end of said shaft and arranged to engage the surface of said workpiece during one direction of rocking movement of the spindle, a gear on the other end of said shaft, a rack cooperating with said gear slidably mounted in said support, a second shaft rocking synchronously with said spindle, a threaded section on said second shaft, a nut engaging said threaded section and thereby receiving a reciprocating translational movement, a pivoted rocker arm having one end secured to said nut and the other end cooperating with said rack to impart a reciprocating motion of said rack synchronous with the rocking movement of said spindle whereby the teeth of said cutter engage the surface of said workpiece along a helical path, means for imparting a constant speed unidirectional movement to said support relative to both the workpiece and said rack whereby the teeth of said cutter effect a rolling engagement with the surface of the workpiece, and means for rotationally indexing said spindle to bring successive stepped surfaces of the workpiece into position to be engaged by said cutter.

47. In a lathe having a bed, a headstock and a compound rest movable along the bed, the improvement comprising a spindle mounted in the headstock and adapted to rigidly support a workpiece having stepped partial cylindrical surfaces, means in the headstock for rocking said spindle thru an arc at least equal to the arcuate extent of the stepped surfaces of the workpiece, a support mounted on the compound rest for movement perpendicular to the rocking axis of said spindle, a shaft mounted in said support, a circular toothed cutter mounted on one end of said shaft and arranged to engage one of the stepped surfaces of the workpiece, a gear on the other end of said shaft, a rack cooperating with said gear slidably mounted in said support, means for reciprocating said rack synchronously with the rocking movement of said spindle whereby the teeth of said cutter engage the surface of said workpiece along a helical path, means reciprocating said support in a direction perpendicular to the lathe bed, said last mentioned means operating synchronously with the rocking movement of said spindle whereby the teeth of said cutter engage the surface of the workpiece only during one direction of rocking movement of the spindle, and means for rotationally indexing said spindle to bring successive stepped surfaces of the workpiece into position to be engaged by said cutter.

48. In a lathe having a bed, a headstock, and a compound rest movable along the bed, the improvement comprising a spindle mounted in the headstock and adapted to rigidly support a workpiece having stepped partial cylindrical surfaces, means in the headstock for rocking said spindle thru an arc at least equal to the arcuate extent of the stepped surfaces of the workpiece, a support mounted on the compound rest for movement perpendicular to the rocking axis of said spindle, a first shaft mounted in said support, a circular toothed cutter mounted on one end of said shaft and arranged to engage the surface of said workpiece, a gear on the other end of said shaft, a rack cooperating with said gear slidably mounted in said support, a second shaft within the headstock rocking synchronously with said spindle, a threaded section on said second shaft, a nut engaging said threaded section and thereby receiving a reciprocating translational movement, a pivoted rocker arm having one end secured to said nut and the other end cooperating with said rack to impart a reciprocating motion to said rack synchronous with the rocking movement of said spindle whereby the teeth of said cutter engage the surface of said workpiece along a helical path, means reciprocating said support in a direction perpendicular to the lathe bed, said last mentioned means operating synchronously with the rocking movement of said spindle whereby the teeth of said cutter engage the surface of the workpiece only during one direction of rocking movement of the spindle, and means for rotationally indexing said spindle to bring successive stepped surfaces of the workpiece into position to be engaged by said cutter.

49. In a lathe having a headstock, a bed and a compound rest movably mounted on the bed, and a tool post mounted on said compound rest for transverse movement with respect to the lathe bed, the improvement comprising a sliding wedge member disposed between said tool post and said compound rest, resilient means biasing said wedge member out of wedging engagement between said tool post and said compound rest, a spindle mounted in said headstock and adapted to support a workpiece, gearing means in the headstock for rocking said spindle, and cam means operative by said gearing means to periodically force said wedge member between said tool post and said compound rest whereby said tool post is moved in a work relieving direction synchronously with the rocking of said spindle.

50. In a lathe having a headstock, a bed and a compound rest movably mounted on the bed, and a tool post mounted on said compound rest for transverse movement with respect to the lathe bed, the improvement comprising a sliding wedge member disposed between said tool post and said compound rest, resilient means biasing said wedge member out of wedging engagement between said tool post and said compound rest, a cam rotatively mounted on said compound rest and arranged to successively advance and retract said wedge member, a splined shaft extending from the headstock, said splined shaft extending into said compound rest in all positions of said compound rest along the lathe bed, a gear for driving said cam slidably mounted on said splined shaft but secured thereto for rotational movement, a spindle mounted in said headstock and adapted to support a workpiece, and gearing means for rocking said spindle and rotating said splined shaft in synchronous relationship to each other whereby said tool post is moved in a work relieving direction synchronously with the rocking of said spindle.

ALFRED J. CONN.
RICHARD B. STANLEY.